(12) United States Patent
Yuki et al.

(10) Patent No.: US 9,031,418 B2
(45) Date of Patent: May 12, 2015

(54) COMMUNICATION SYSTEM, MEASURING APPARATUS, TRANSMITTING APPARATUS, AND MEASUREMENT METHOD

(75) Inventors: Masahiro Yuki, Kawasaki (JP); Takafumi Terahara, Kawasaki (JP); Norifumi Shukunami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 21 days.

(21) Appl. No.: 13/292,430

(22) Filed: Nov. 9, 2011

(65) Prior Publication Data

US 2012/0128351 A1 May 24, 2012

(30) Foreign Application Priority Data

Nov. 24, 2010 (JP) .................................. 2010-261306

(51) Int. Cl.
*H04B 10/077* (2013.01)
*H04B 10/564* (2013.01)
(Continued)

(52) U.S. Cl.
CPC ........ *H04B 10/0779* (2013.01); *H04B 10/5057* (2013.01); *H04B 10/564* (2013.01); *H04B 10/532* (2013.01); *H04B 10/0775* (2013.01); *H04B 10/2572* (2013.01); *H04B 2210/075* (2013.01); *H04J 14/0204* (2013.01); *H04J 14/0205* (2013.01); *H04J 14/022* (2013.01); *H04J 14/0275* (2013.01);
(Continued)

(58) Field of Classification Search
CPC .................................................... H04B 10/564
USPC ........................................................ 398/184
See application file for complete search history.

(56) References Cited

U.S. PATENT DOCUMENTS

| 5,111,322 A * | 5/1992 | Bergano et al. ................. 398/74 |
| 2003/0175033 A1* | 9/2003 | Taga et al. ..................... 398/152 |

(Continued)

FOREIGN PATENT DOCUMENTS

| JP | 2002-344426 | 11/2002 |
| JP | 2003-338805 | 11/2003 |

(Continued)

OTHER PUBLICATIONS

Cvijetic, Milorad, Optical Transmission Systems Engineering, 2004, Artech House, Inc., pp. 50-51.*

(Continued)

*Primary Examiner* — Ken Vanderpuye
*Assistant Examiner* — Jai Lee
(74) *Attorney, Agent, or Firm* — Staas & Halsey LLP

(57) ABSTRACT

A communication system including: a transmission apparatus configured to modulate a first light by using a first signal to be transferred and a second signal having a frequency different from a frequency of the first signal so as to generate a first optical signal, modulate a second light by using a third signal to be transferred and a fourth signal having a frequency different from a frequency of the third signal so as to generate a second optical signal, polarization-multiplex the first optical signal and the second optical signal, and transmit a polarization-multiplexed optical signal in which the first optical signal and the second optical signal are polarization-multiplexed, each of the first light and the second light being polarized; and a measuring apparatus configured to measure powers of the second signal and the fourth signal which are included in the polarization-multiplexed optical signal transmitted from the transmission apparatus.

17 Claims, 30 Drawing Sheets

(51) Int. Cl.
  *H04B 10/2507* (2013.01)
  *H04J 14/06* (2006.01)
  *H04B 10/50* (2013.01)
  *H04B 10/532* (2013.01)
  *H04J 14/02* (2006.01)

(52) U.S. Cl.
  CPC ......... *H04J 14/0276* (2013.01); *H04J 14/0283* (2013.01); *H04J 14/06* (2013.01)

(56) References Cited

U.S. PATENT DOCUMENTS

| | | |
|---|---|---|
| 2006/0127102 A1* | 6/2006 | Roberts et al. ............. 398/182 |
| 2008/0145066 A1 | 6/2008 | Hoshida |
| 2008/0232816 A1 | 9/2008 | Hoshida et al. |
| 2010/0098420 A1* | 4/2010 | Ibragimov et al. ............. 398/65 |
| 2011/0222850 A1* | 9/2011 | Roberts et al. ............. 398/38 |
| 2011/0222853 A1* | 9/2011 | Tanaka et al. ............. 398/65 |

FOREIGN PATENT DOCUMENTS

| | | |
|---|---|---|
| JP | 2005-65027 | 3/2005 |
| JP | 2008-153863 | 7/2008 |
| JP | 2008-263590 | 10/2008 |
| JP | 2010-226499 | 10/2010 |

OTHER PUBLICATIONS

Profile Inc., Basic Notes Laser Diodes, 2000, Profile Inc., p. 12.*
O. Vassilieva, et al., "Impact of Polarization Dependent Loss and Cross-Phase Modulation on Polarization Multiplexed DQPSK Signals", IEEE, OFC/NFOEC, 2008.
Japanese Office Action issued Jan. 13, 2015 in corresponding Japanese Patent Application No. 2010-261306.

* cited by examiner

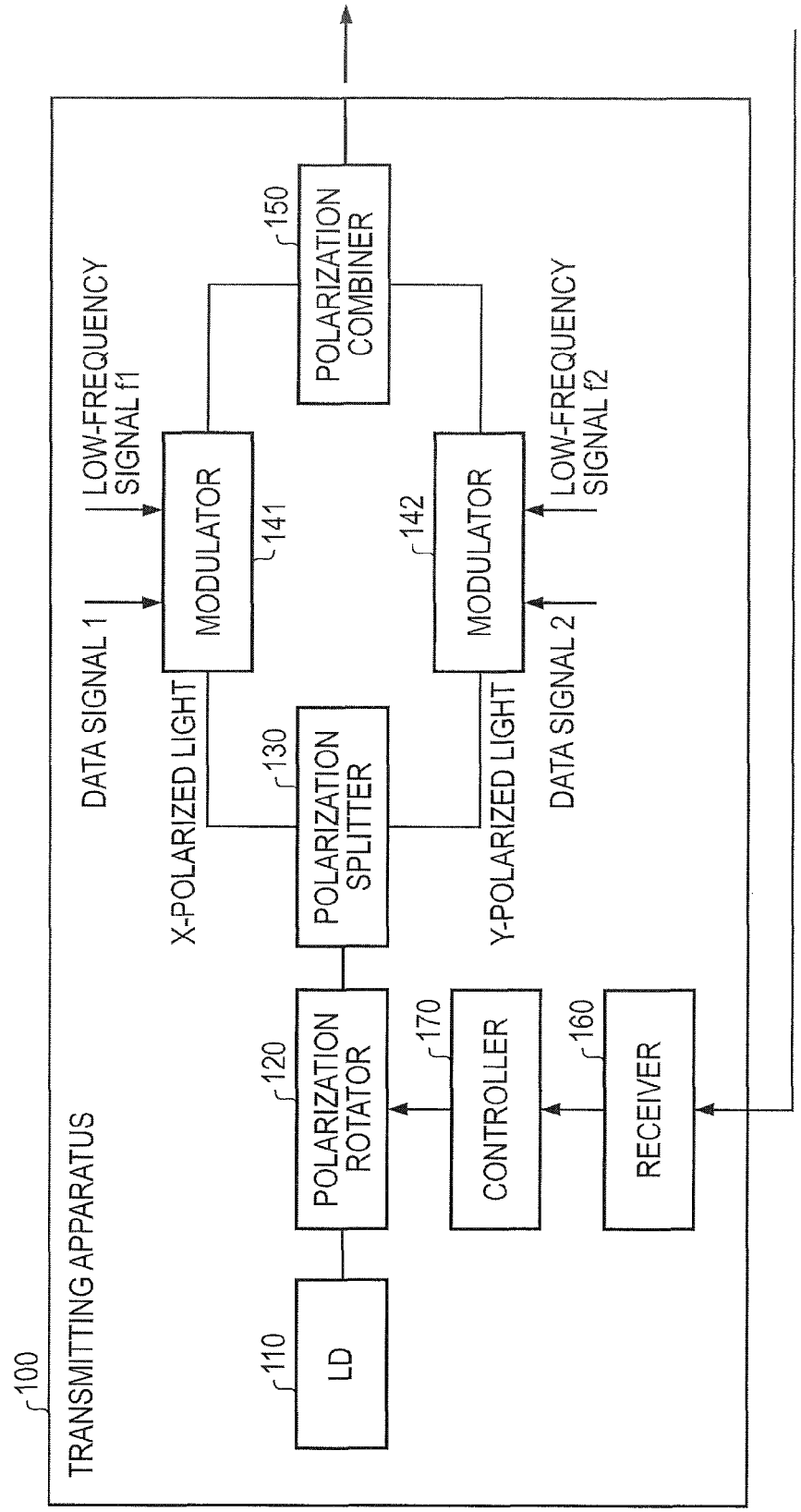

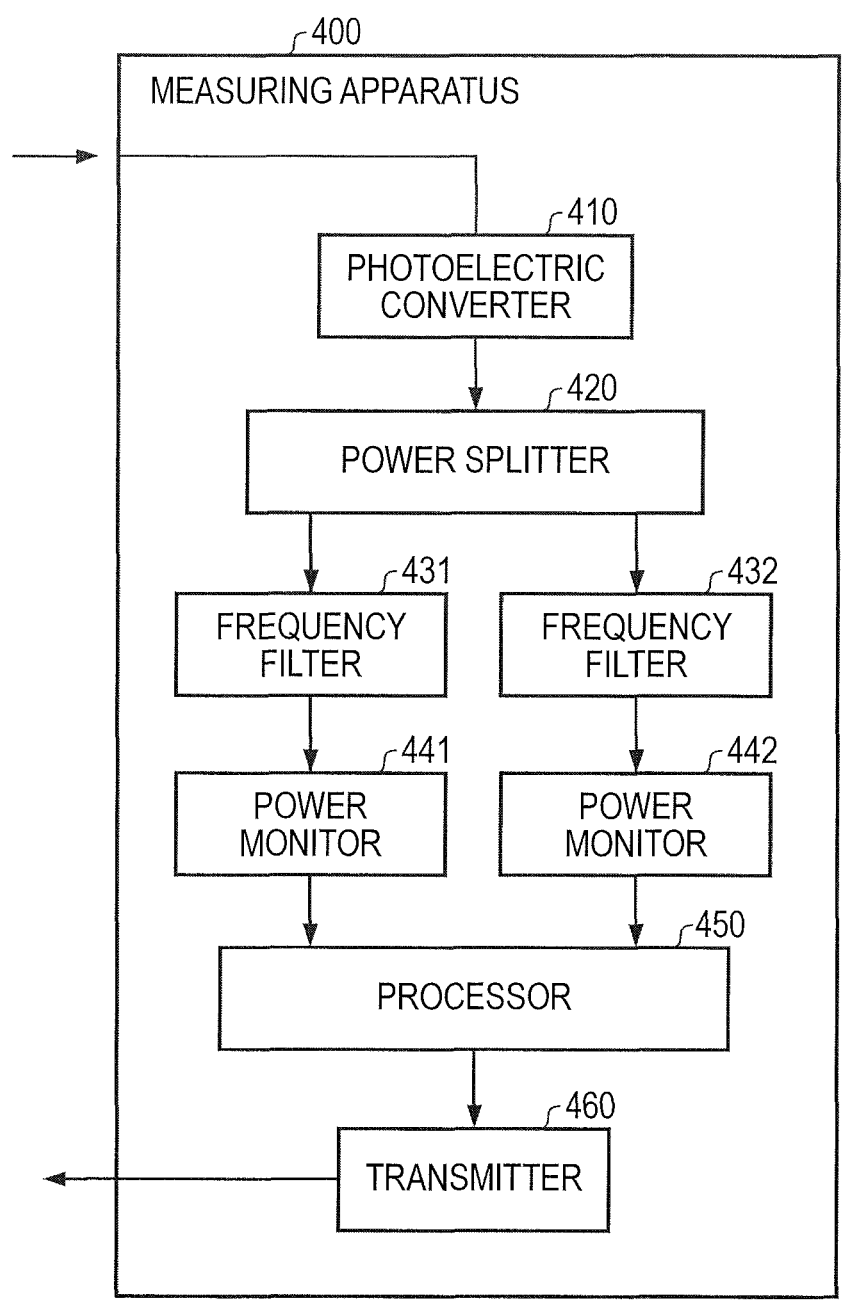

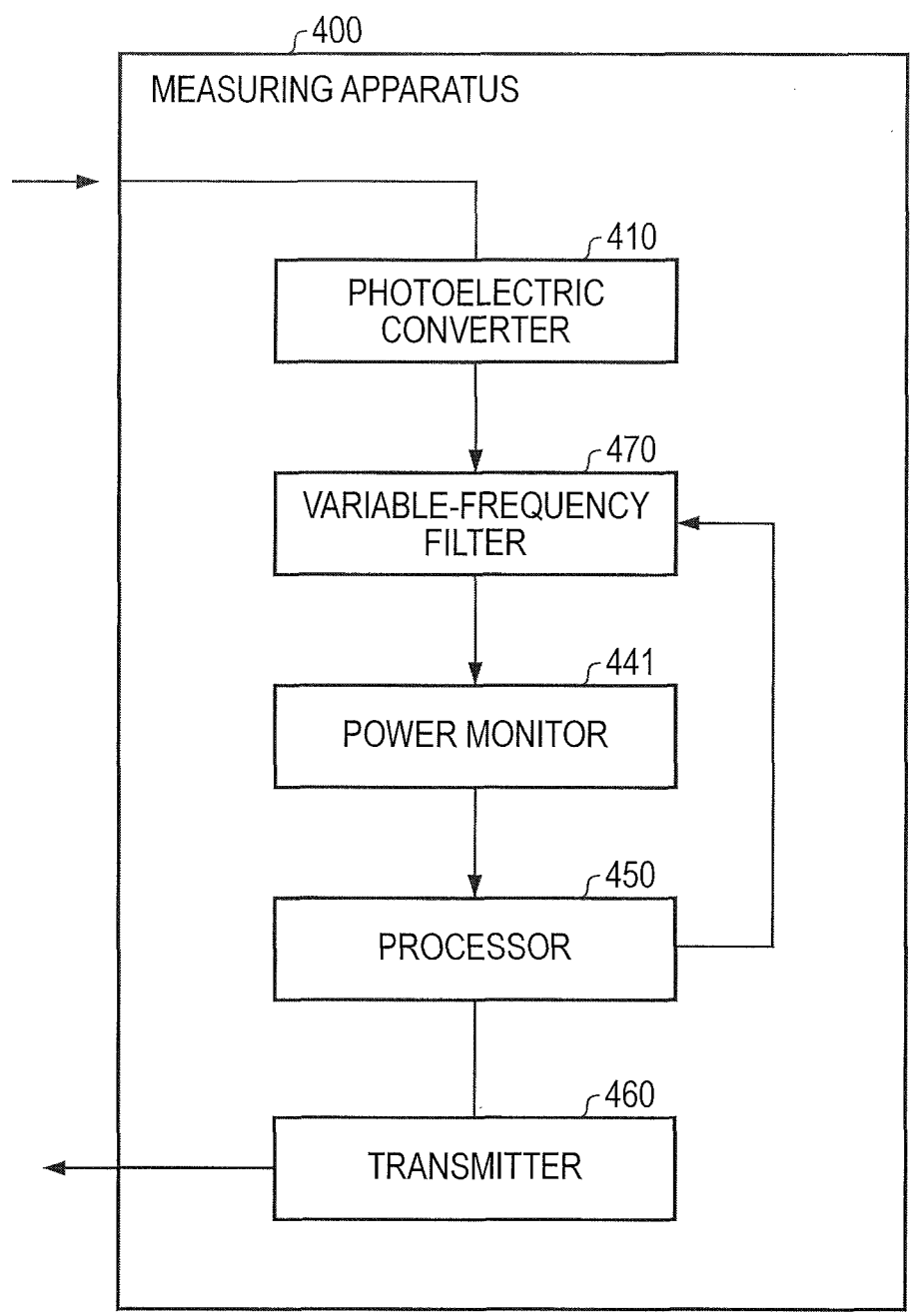

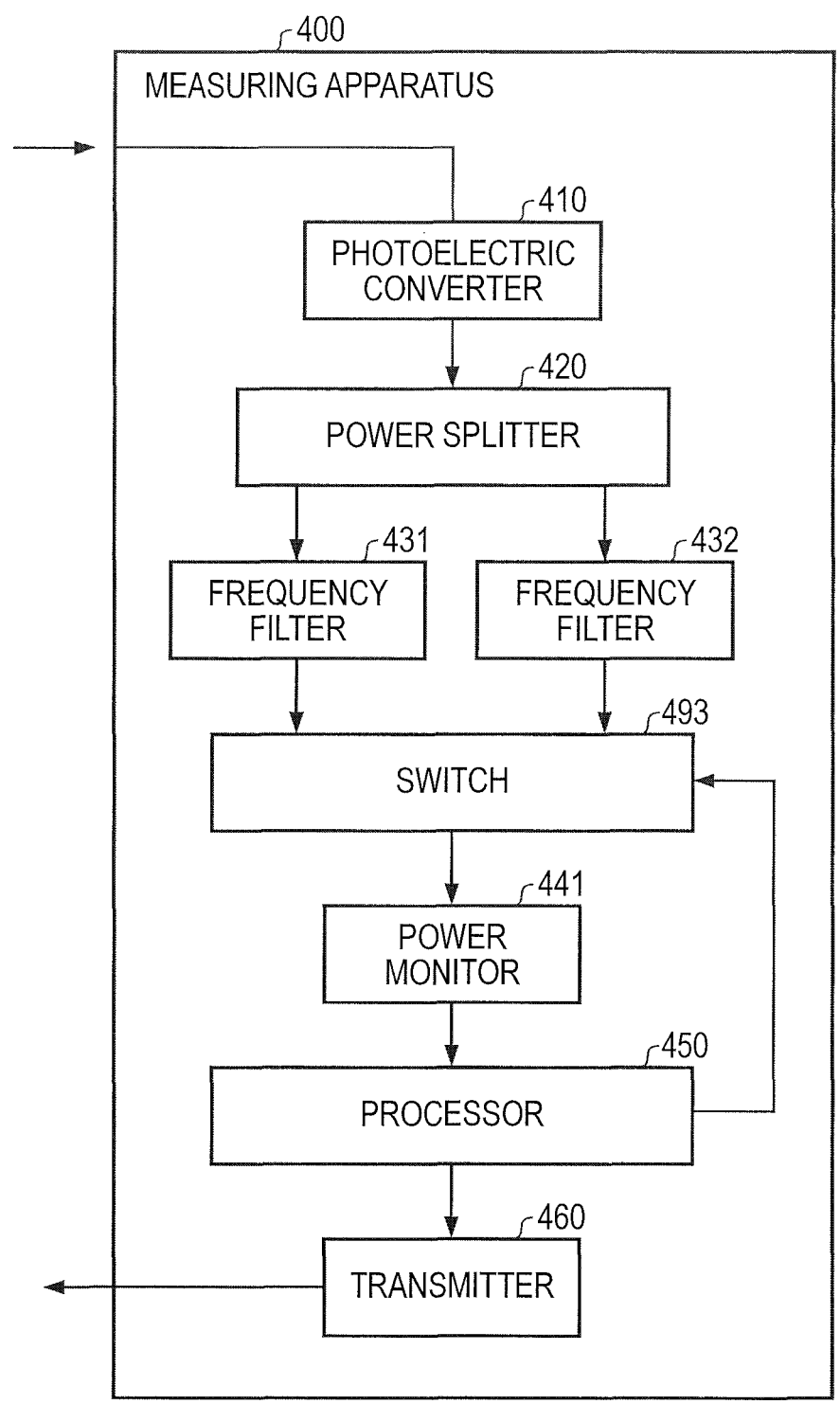

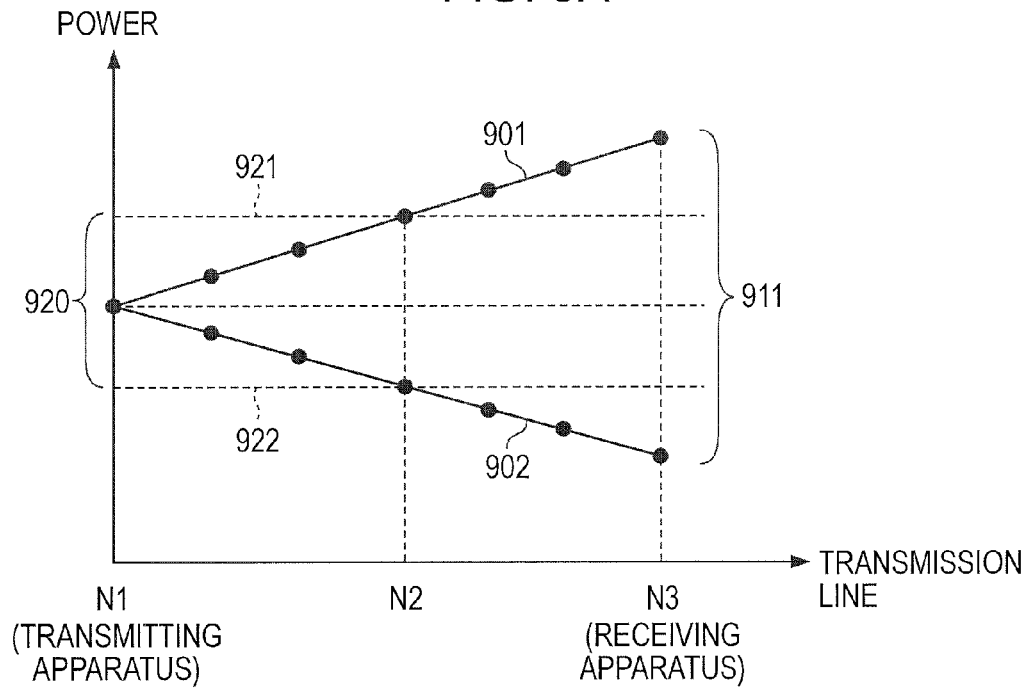
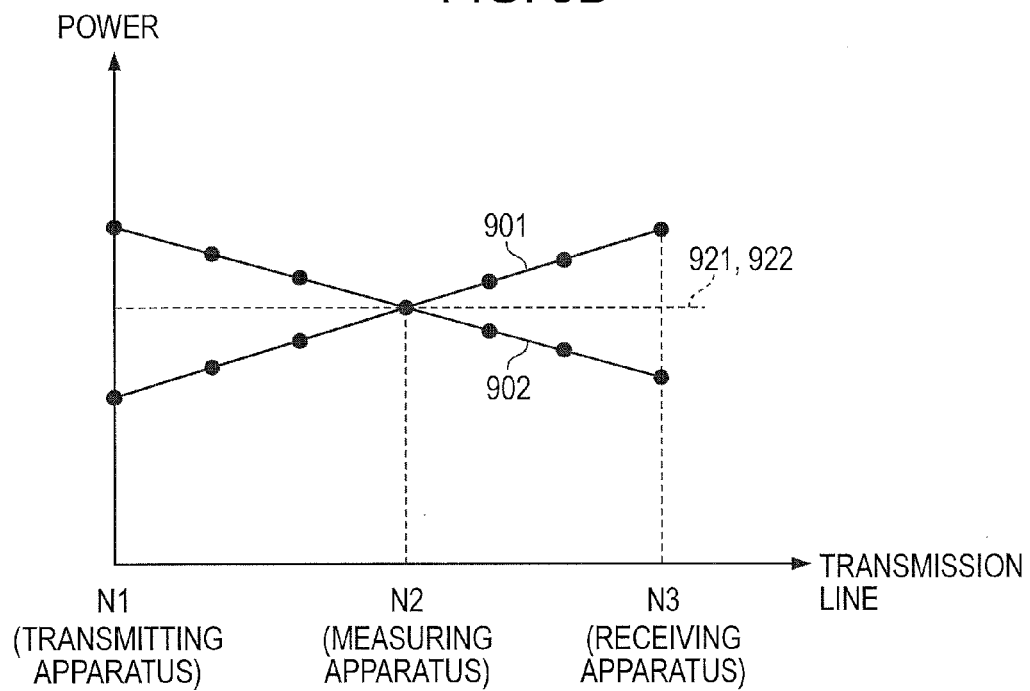

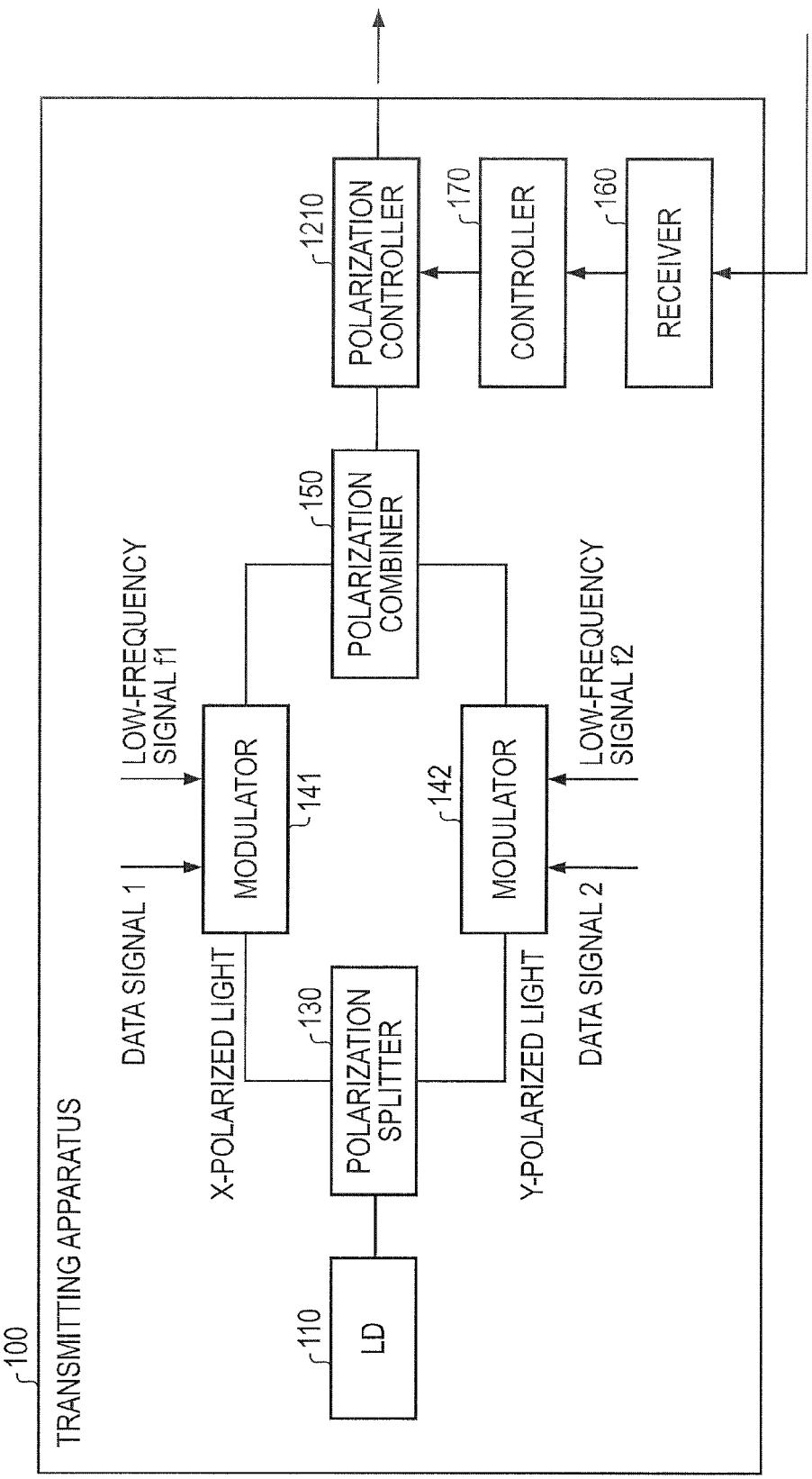

COMMUNICATION SYSTEM, MEASURING APPARATUS, TRANSMITTING APPARATUS, AND MEASUREMENT METHOD

CROSS-REFERENCE TO RELATED APPLICATION

This application is based upon and claims the benefit of priority of the prior Japanese Patent Application No. 2010-261306, filed on Nov. 24, 2010, the entire contents of which are incorporated herein by reference.

FIELD

The embodiments discussed herein are related to a communication system, a measuring apparatus, a transmitting apparatus, and a measurement method.

BACKGROUND

To achieve optical transmission systems at, for example, at least 40 Gbps, polarization-multiplexing is being studied (see Japanese Laid-open Patent Publication Nos. 2002-344426, 2003-338805, and 2005-65027, for example). In polarization-multiplexing, two mutually orthogonal polarized signals, for example, are multiplexed with the same wavelength and two independent signal information items are transmitted.

Polarization-multiplexing enables the use of a plurality of polarization states, so the baud rate of a signal to be transmitted is reduced and the frequency usage efficiency is increased. It is also known about polarization-multiplexing that a difference in power is caused between polarized optical signals because optical parts and optical transmission lines generates a polarization dependent loss (PDL), and transmission performance is thereby lowered (see O. Vassilieva et al. "Impact of Polarization Dependent Loss and Cross-Phase Modulation on Polarization Multiplexed DQPSK Signals", OFC/NFOEC, 2008, for example).

In the prior art described above, however, the difference in power between polarized signals is difficult to measure. Therefore, for example, the difference in power between polarized signals cannot be precisely measured and optical transmission performance is thereby lowered.

SUMMARY

According to an aspect of the embodiment, there is provided a communication system including: a transmission apparatus configured to modulate a first light by using a first signal to be transferred and a second signal having a frequency different from a frequency of the first signal so as to generate a first optical signal, modulate a second light by using a third signal to be transferred and a fourth signal having a frequency different from a frequency of the third signal so as to generate a second optical signal, polarization-multiplex the first optical signal and the second optical signal, and transmit a polarization-multiplexed optical signal in which the first optical signal and the second optical signal are polarization-multiplexed, each of the first light and the second light being polarized; and a measuring apparatus configured to measure powers of the second signal and the fourth signal which are included in the polarization-multiplexed optical signal transmitted from the transmission apparatus, the measuring apparatus being disposed on a path through which the polarization-multiplexed optical signal is transferred.

The object and advantages of the invention will be realized and attained by means of the elements and combinations particularly pointed out in the claims.

It is to be understood that both the foregoing general description and the following detailed description are exemplary and explanatory, and are not restrictive of the invention, as claimed.

BRIEF DESCRIPTION OF DRAWINGS

FIG. 1 illustrates an example of a transmitting apparatus according to an embodiment;

FIG. 4A illustrates an example of a measuring apparatus according to an embodiment;

FIG. 4B illustrates a first variation of the measuring apparatus depicted in FIG. 4A;

FIG. 4D illustrates a third variation of the measuring apparatus depicted in FIG. 4A;

FIG. 9A illustrates optical power characteristics in a transmission line;

FIG. 9B illustrates a first control example of a difference in power between polarized signals;

FIG. 12 illustrates a first variation of the transmitting apparatus depicted in FIG. 1;

DESCRIPTION OF EMBODIMENTS

Figure 2A:
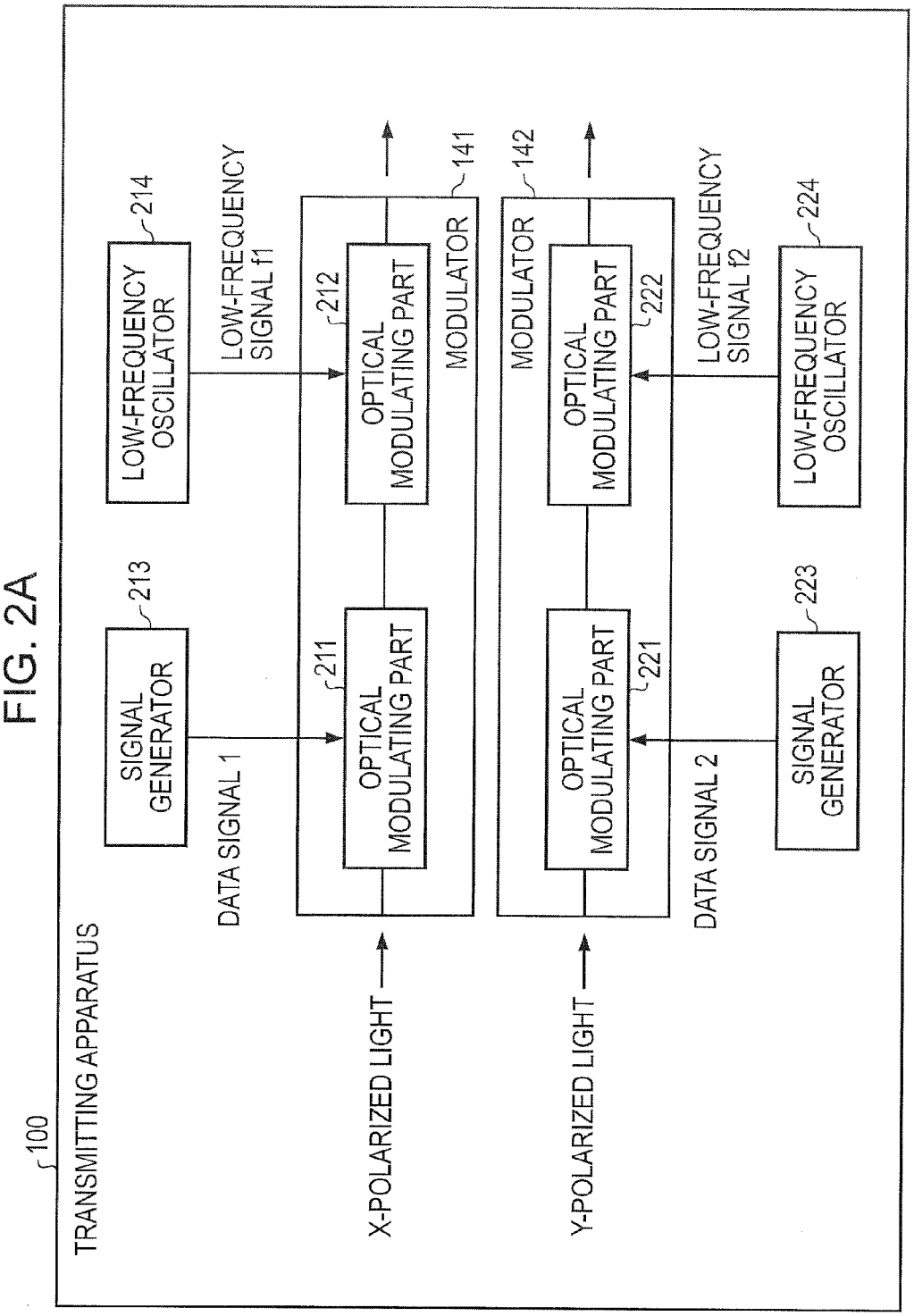
FIG. 2A illustrates an example of the modulator depicted in FIG. 1.

To measure the difference in power between polarized signals, a polarization controller and polarization splitter may be used for splitting into each polarized signal and its power may be then monitored. If the polarization state quickly changes, however, the splitting into polarized signals is difficult. There is another problem in that the addition of optical parts such as the polarization controller and polarization splitter causes the apparatus to become complex and large.

The communication system, measuring apparatus, transmitting apparatus, and measurement method in the disclosure solve the above problems and an object of the disclosure is to measure a difference in power between polarized signals by the use of a simple structure.

Preferable embodiments in the disclosed technology will be described in detail with reference to the attached drawings.

Embodiments

FIG. 1 illustrates an example of a transmitting apparatus according to an embodiment. As depicted in FIG. 1, the transmitting apparatus 100 according the embodiment includes a laser diode (LD) 110, a polarization rotator 120, a polarization splitter 130, modulators 141 and 142, a polarization combiner 150, a receiver 160, and a controller 170. The transmitting apparatus 100 transmits an optical signal modulated by a data signal 1 and a data signal 2, received respectively.

The LD 110 generates light and outputs the generated light to the polarization rotator 120. The light output from the LD 110 is, for example, substantially linearly polarized light. The polarization rotator 120 rotates the polarized light output from the LD 110. An amount by which the polarized light is rotated by the polarization rotator 120 is controlled by the controller 170. The polarization rotator 120 outputs the light, the polarized light of which has been rotated, to the polarization splitter 130.

The polarization splitter 130 splits the polarized light output from the polarization rotator 120 into polarized lights. for example, mutually orthogonal polarized lights (referred to as the X-polarized light and Y-polarized light). The polarization splitter 130 outputs the split X polarized light to the modulator 141, and also outputs the split Y polarized light to the modulator 142.

The modulators 141 and 142 are used as superimposing units that modulate the X-polarized light and Y-polarized light by using the data signal 1 and the data signal 2, respectively, and superimpose signals having different frequencies from frequencies of the data signals on the, X-polarized light and Y-polarized light, respectively. The modulator 141 receives the data signal 1 and a low-frequency signal f1 and uses these signals to modulate the X-polarized light received from the polarization splitter 130. The low-frequency signal f1 has a different frequency from the data signal 1. For example, the low-frequency signal f1 is a sine wave (clock signal) that has a sufficiently lower frequency than the data signal 1. Then, the low-frequency signal f1 can be superimposed on the X-polarized light. The modulator 141 outputs the modulated optical signal to the polarization combiner 150.

The modulator 142 receives the data signal 2 and a low-frequency signal f2 and uses these signals to modulate the Y-polarized light received from the polarization splitter 130. The low-frequency signal f2 has a different frequency from the data signal 2 and low-frequency signal f1. For example, the low-frequency signal f2 is a sine wave (clock signal), its frequency being sufficiently lower than the frequency of the data signal 2 and being different from the frequency of the low-frequency signal f1. Then, the low-frequency signal f2 can be superimposed on the Y-polarized light. The modulator 142 outputs the modulated optical signal to the polarization combiner 150.

The polarization combiner 150 is used as a multiplexer that polarization-multiplexes the modulated optical signals on which the relevant signals have been superimposed by the superimposing units. In polarization-multiplexing, the polarization combiner 150 combines the optical signal output from the modulator 141 (X polarized light) and the optical signal output from the modulator 142 (Y polarized light). The polarization combiner 150 outputs the combined optical signal (polarization-multiplexed optical signal). The polarization combiner 150 is implemented by, for example, a polarization combiner or an optical coupler. The optical signal output from the polarization combiner 150 is sent through an output port of the transmitting apparatus 100 to a transmission line (an optical fiber, for example).

The receiver 160 is a communication interface that receives prescribed information (data) from a measuring apparatus (see FIGS. 4A to 4D, for example) provided on the network, through which the optical signal that has been polarization-multiplexed is sent by the polarization combiner 150. The communication system used by the receiver 160 is not limited to optical communication; various types of communication systems such as electric communication and wireless communication can be used. The receiver 160 outputs the received prescribed information to the controller 170.

The prescribed information is based on the power (intensity) of the low-frequency signals f1 and f2 that have been measured by the measuring apparatus. For example, the prescribed information indicates the power of the low-frequency signal f1 and the power of low-frequency signal f2 that have been measured by the measuring apparatus. Alternatively, the prescribed information may be information indicating a difference between the power of the low-frequency signal f1 and the power of the low-frequency signal f2 that have been measured by the measuring apparatus. Alternatively, the prescribed information may be information indicating a control command created from a difference between the power of the low-frequency signal f1 and the power of the low-frequency signal f2 that have been measured by the measuring apparatus, the control command being used to control a difference in power between polarized lights.

The controller 170 controls an amount by which the polarized light is rotated by the polarization rotator 120, according to the prescribed information output from the receiver 160. Then, it becomes possible to change a power split ratio between the polarized lights to be split by the polarization splitter 130 and to control a power difference (intensity difference) between the polarized lights of a polarization-multiplexed signal to be sent from the transmitting apparatus 100. The controller 170 can be implemented by, for example, a digital signal processor (DSP) or another operation means.

For example, the controller 170 controls the difference between the power of the low-frequency signal f1 and the power of the low-frequency signal f2 that have been measured by the measuring apparatus so that the difference is reduced. Alternatively, the controller 170 may control the difference between the power of the low-frequency signal f1 and the power of the low-frequency signal f2 that have been measured by the measuring apparatus so that the difference does not exceed a threshold. Alternatively, the controller 170 may control the difference between the power of the low-frequency signal f1 and the power of the low-frequency signal f2 that have been measured by the measuring apparatus so that the difference falls within a prescribed range.

As described above, the transmitting apparatus 100 superimposes the low-frequency signals f1 and f2 having different frequencies on the polarized lights of polarization-multiplexed light, and receives prescribed information based on the intensities of the low-frequency signals f1 and f2, which have been measured by a measuring apparatus provided on the network. Then, the PDL-caused difference in power between the polarized lights can be measured by the measuring apparatus on the network. It is thereby possible to control the difference in power between the polarized lights of the polarization-multiplexed light and measure the difference with a simple structure.

FIG. 2A gives an example of the modulator depicted in FIG. 1, depicting part of the transmitting apparatus 100 in FIG. 1. As depicted in FIG. 2A, the modulator 141 in FIG. 1 has optical modulating parts 211 and 212, the modulator 142 in FIG. 1 has optical modulating parts 221 and 222, and the transmitting apparatus 100 in FIG. 1 has signal generators 213 and 223 and low-frequency oscillators 214 and 224.

The signal generator 213 generates the data signal 1 and outputs it to the optical modulating part 211. The low-frequency oscillator 214 oscillates the low-frequency signal f1 and outputs it to the optical modulating part 212. The low-frequency signal f1 output from the low-frequency oscillator 214 has a frequency that is sufficiently lower than the frequency of the data signal 1 and is different from the frequency at which the transmitting apparatus 100 is controlled.

The optical modulating part 211 receives light (X-polarized light) supplied to the modulator 141 and also receives the data signal 1 output from the signal generator 213. The optical modulating part 211 uses the data signal 1 to modulate the received light (X-polarized light) and outputs the modulated light (optical signal) to the optical modulating part 212. The optical modulating part 212 receives the low-frequency signal f1 output from the low-frequency oscillator 214 and uses the low-frequency signal f1 to modulate the optical signal output from the optical modulating part 211. Then, the optical modulating part 212 outputs the modulated optical signal to a stage behind the modulator 141. In this way, the light supplied to the modulator 141 is modulated by using the data signal 1 and the low-frequency signal f1 is superimposed on the modulated light.

The signal generator 223 generates the data signal 2 and outputs it to the optical modulating part 221. The low-frequency oscillator 224 oscillates the low-frequency signal f2 and outputs it to the optical modulating part 222. The low-frequency signal f2 output from the low-frequency oscillator 224 has a frequency that is sufficiently lower than the frequency of the data signal 2 and is different from the frequency of the low-frequency signal f1 and from the frequency at which the transmitting apparatus 100 is controlled.

The optical modulating part 221 receives light (Y-polarized light) supplied to the modulator 142 and also receives the data signal 2 output from the signal generator 223. The optical modulating part 221 uses the data signal 2 to modulate the received light (Y-polarized light) and outputs the modulated light (optical signal) to the optical modulating part 222. The optical modulating part 222 receives the low-frequency signal f2 output from the low-frequency oscillator 224 and uses the low-frequency signal f2 to modulate the optical signal output from the optical modulating part 221. Then, the optical modulating part 222 outputs the modulated optical signal to a stage behind the modulator 142. In this way, the light supplied to the modulator 142 is modulated by using the data signal 2 and the low-frequency signal f2 is superimposed on the modulated light.

With the optical modulating part 211 and optical modulating part 221, non-return-to-zero (NRZ) intensity modulation, return-to-zero (RZ) intensity modulation, or the like can be used. Alternatively, the optical modulating part 211 and optical modulating part 221 can use phase shift keying (PSK), differential PSK (DPSK), quadrature PSK (QPSK), differential QPSK (DQPSK), and other phase modulation methods.

With the optical modulating part 211 and optical modulating part 221, quadrature amplitude modulation (N-QAM) and other modulation methods in which both intensity modulation and phase modulation are used can also be used. As the optical modulating parts 211, 212, 221, and 222, a Mach-Zehnder (MZ) lithium niobate (LiNbO3) modulator and a semiconductor modulator can be used, for example.

Although, in the structure described above, the optical modulating parts 212 and 222 have been respectively placed behind the optical modulating parts 211 and 221, the optical modulating parts 212 and 222 may be respectively placed in front of the optical modulating parts 211 and 221.

Figure 2B:
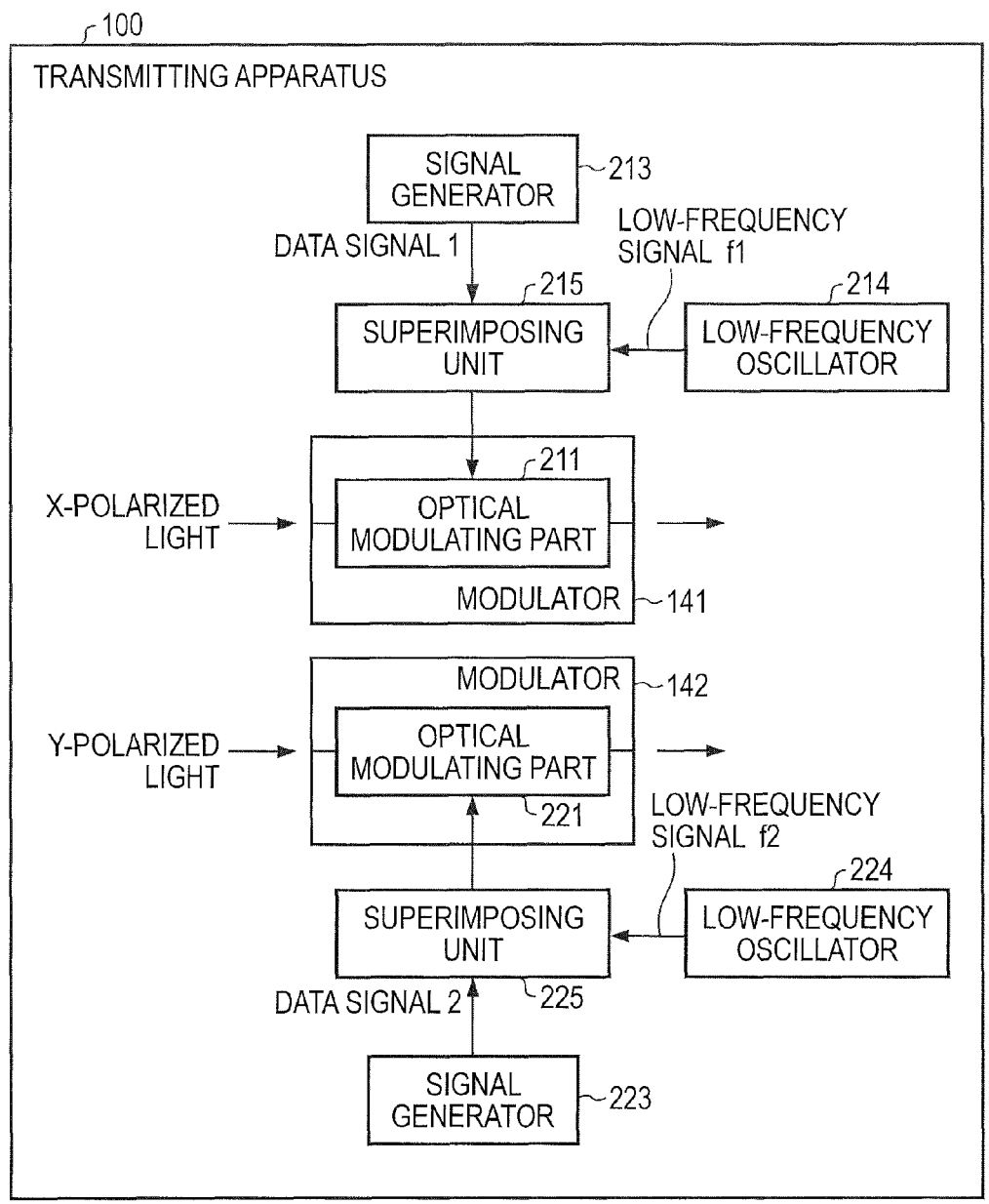
FIG. 2B illustrates a first variation of the modulator depicted in FIG. 2A.

FIG. 2B gives a first variation of the modulator depicted in FIG. 2A. In FIG. 2B, the same elements as in FIG. 2A are denoted by the same reference numerals to eliminate duplicate descriptions. As depicted in FIG. 2B, the transmitting apparatus 100 may have superimposing units 215 and 225, besides the structure depicted in FIG. 2A. If the superimposing unit 215 and superimposing unit 225 are added, the optical modulating part 212 and optical modulating part 222 depicted in FIG. 2A may be eliminated.

The signal generator 213 outputs the data signal 1 to the superimposing unit 215, and the low-frequency oscillator 214 outputs the low-frequency signal f1 to the superimposing unit 215. The superimposing unit 215 superimposes the low-frequency signal f1 output from the low-frequency oscillator 214 on the data signal 1 output from the signal generator 213. For example, the superimposing unit 215 performs the superimposition by adding the low-frequency signal f1 to the data signal 1. The superimposing unit 215 outputs the data signal 1, on which the low-frequency signal f1 has been superimposed, to the optical modulating part 211. The optical modulating part 211 uses the data signal 1 output from the superimposing unit 215 to modulate light (X-polarized light).

The signal generator 223 outputs the data signal 2 to the superimposing unit 225, and the low-frequency oscillator 224 outputs the low-frequency signal f2 to the superimposing unit 225. The superimposing unit 225 superimposes the low-frequency signal f2 output from the low-frequency oscillator 224 on the data signal 2 output from the signal generator 223. For example, the superimposing unit 225 performs the superimposition by adding the low-frequency signal f2 to the data signal 2. The superimposing unit 225 outputs the data signal 2, on which the low-frequency signal f2 has been superimposed, to the optical modulating part 221. The optical modulating part 221 uses the data signal 2 output from the superimposing unit 225 to modulate light (Y-polarized light).

When the low-frequency signals f1 and f2 are respectively superimposed on the data signal 1 and data signal 2 as described above, the optical modulating parts 212 and 222 can be eliminated, reducing the number of optical parts. Then, the low-frequency signals f1 and f2 can be superimposed on polarized lights (X-polarized light, Y-polarized light) with a simple structure.

Figure 2C:
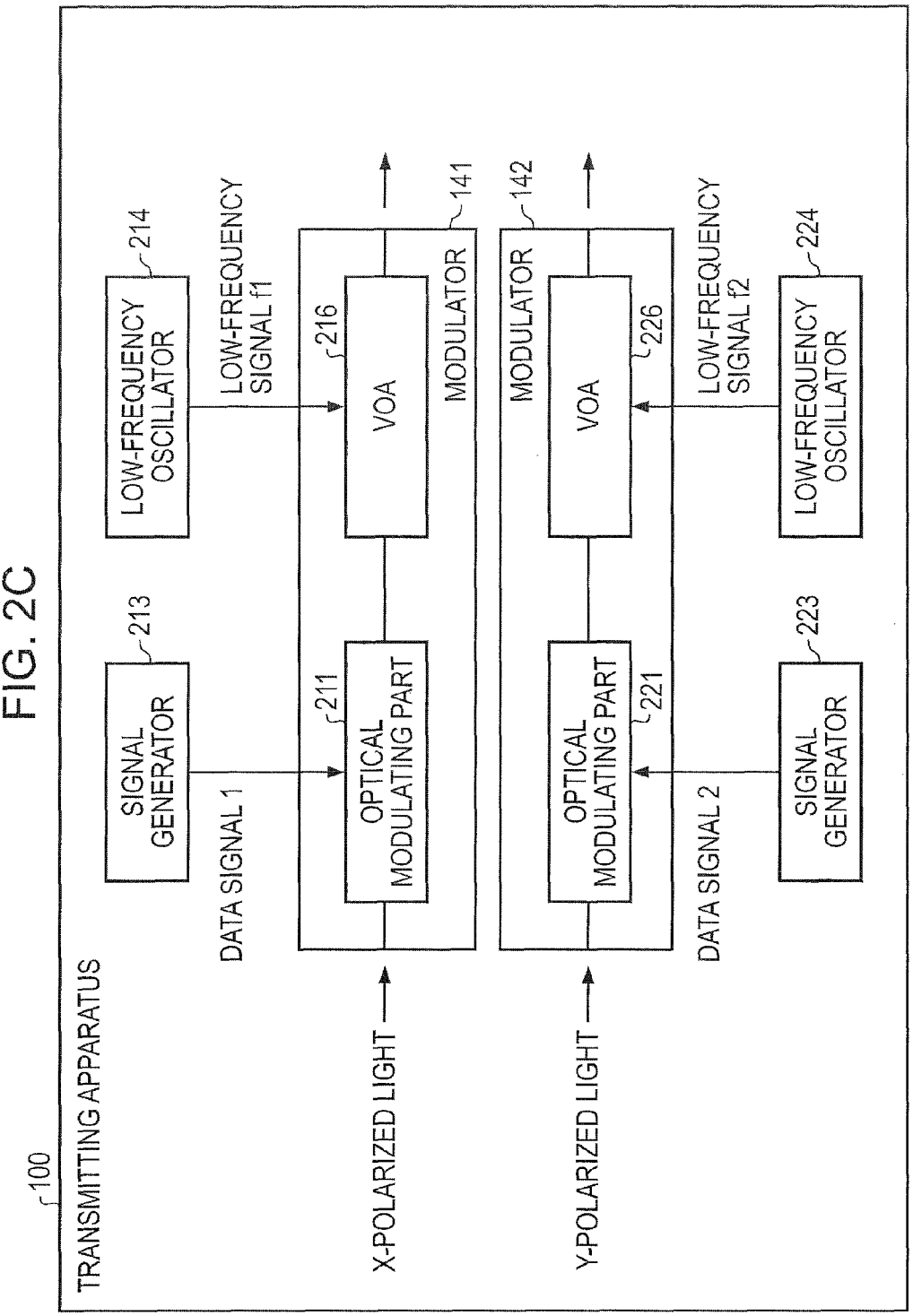
FIG. 2C is a second variation of the modulator depicted in FIG. 2A.

FIG. 2C gives a second variation of the modulator depicted in FIG. 2A. In FIG. 2C, the same elements as in FIG. 2A are denoted by the same reference numerals to eliminate duplicate descriptions. As depicted in FIG. 2C, the transmitting apparatus 100 may have variable optical attenuators (VOAs) 216 and 226, instead of the optical modulating parts 212 and 222 depicted in FIG. 2A.

The optical modulating part 211 outputs the modulated optical signal to the VOA 216. The VOA 216 attenuates the optical signal output from the optical modulating part 211 according to the low-frequency signal f1 output from the low-frequency oscillator 214. Then, the optical signal output from the optical modulating part 211 can be modulated by using the low-frequency signal f1. The optical modulating part 211 outputs the attenuated optical signal to a stage behind the modulator 141.

The optical modulating part 221 outputs the modulated optical signal to the VOA 226. The VOA 226 attenuates the optical signal output from the optical modulating part 221 according to the low-frequency signal f2 output from the low-frequency oscillator 224. Then, the optical signal output from the optical modulating part 221 can be modulated by using the low-frequency signal f2. The optical modulating part 221 outputs the attenuated optical signal to a stage behind the modulator 142. The VOA 216 and VOA 226 may be used to perform modulation based on the low-frequency signals f1 and f2, in this way.

Figure 3:
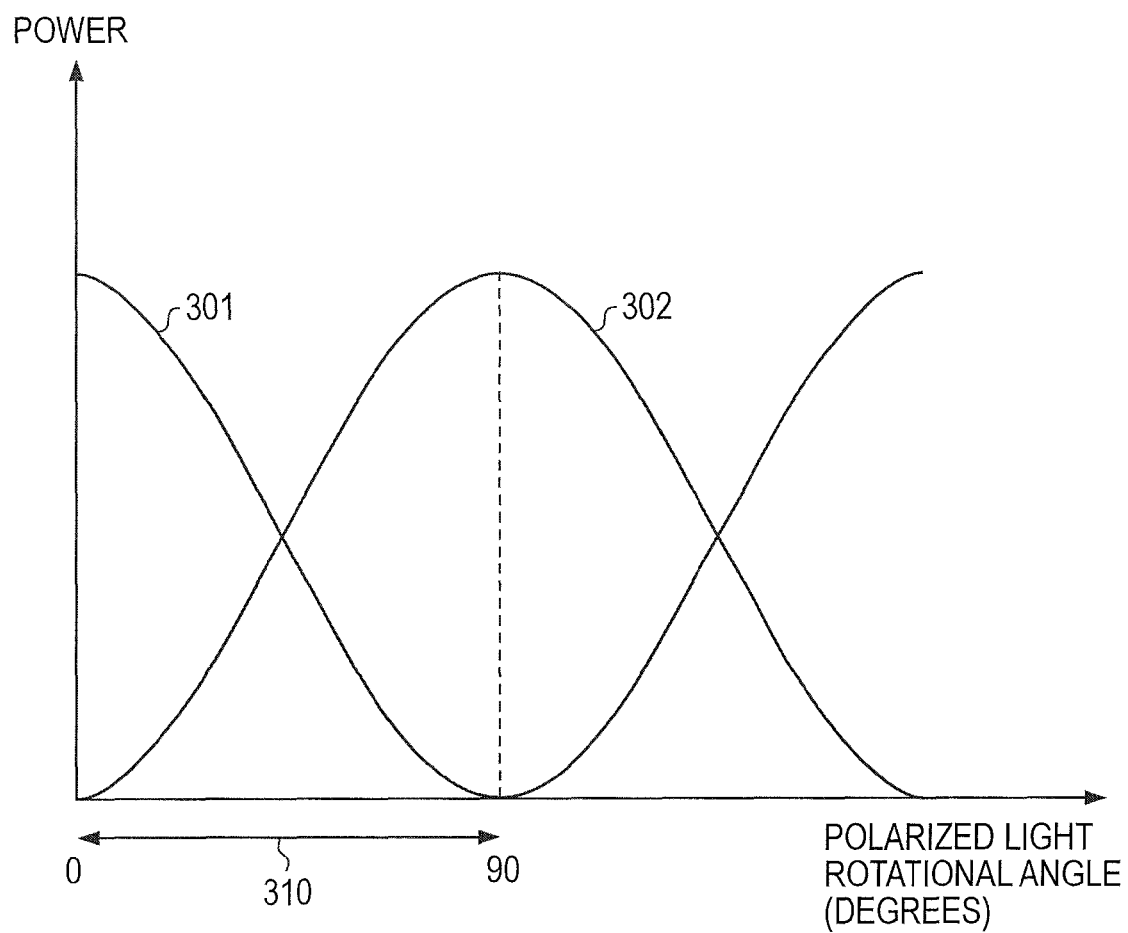
FIG. 3 illustrates how power of each polarized light is controlled according to the rotational angle through which the polarized light is rotated by a polarization rotator.

FIG. 3 illustrates how power of each polarized light is controlled according to the rotational angle through which the polarized light is rotated by a polarization rotator. In FIG. 3, the horizontal axis indicates the rotational angle (in degrees) through which the polarized light is rotated by the polarization rotator 120, and the vertical axis indicates the power of light. A characteristic curve 301 indicates the characteristic of the optical power of the X polarized light output from the polarization splitter 130 to the modulator 141, with respect to the rotational angle through which the polarized light is rotated by the polarization rotator 120. A characteristic curve 302 indicates the characteristic of the optical power of the Y polarized light output from the polarization splitter 130 to the modulator 142, with respect to the rotational angle through which the polarized light is rotated by the polarization rotator 120.

A control range 310 (from 0 degree to 90 degrees) is just an example of a control range for the rotational angle through which the polarized light is rotated by the polarization rotator 120. When the rotational angle of the polarized light is changed within the control range 310, for example, the optical power split ratio can be changed by the polarization splitter 130. Accordingly, the difference in power between the X polarized light to be output to the modulator 141 and the Y polarized light to be output to the 142 can be controlled. Therefore, the difference in power between the polarized lights of the polarization-multiplexed light to be sent by the transmitting apparatus 100 can be controlled.

If, for example, the rotational angle through which the polarized light is rotated by the polarization rotator 120 is changed toward 0 degree, the power of the X-polarized light is increased and the power of the Y-polarized light is decreased. If the rotational angle of the polarized light is changed toward 90 degrees, the power of the X-polarized light is decreased and the power of the Y-polarized light is increased.

FIG. 4A gives an example of a measuring apparatus according to an embodiment. The measuring apparatus 400 in FIG. 4A is allocated on the path on which the polarization-multiplexed optical signal is transferred by the transmitting apparatus 100 in FIG. 1 (the measuring apparatus 400 is allocated in an intermediate node or a receiving node). The measuring apparatus 400 includes a photoelectric converter 410, a power splitter 420, a frequency filters 431 and 432, power monitors 441 and 442, a processor 450, and a transmitter 460. The photoelectric converter 410, power splitter 420, frequency filters 431 and 432, and power monitors 441 and 442 can be used as the measuring section that measures the intensities (powers) of the low-frequency signals f1 and f2 included in the polarization-multiplexed light sent by the transmitting apparatus 100.

The photoelectric converter 410 receives the optical signal sent by the transmitting apparatus 100. The photoelectric converter 410 is a photo detector (PD), which converts an optical signal to an electric signal. The photoelectric converter 410 outputs an electric signal resulting from the photoelectric conversion to the power splitter 420. The power splitter 420 splits the signal output from the photoelectric converter 410 (the power of the signal is split), and outputs the resulting split signals to the frequency filters 431 and 432. An optical coupler can be used as the power splitter 420, for example.

The frequency filter 431 extracts the frequency component of the low-frequency signal f1 output from the power splitter 420, and outputs the extracted signal to the power monitor 441. The frequency filter 432 extracts the frequency component of the low-frequency signal f2 output from the power splitter 420, and outputs the extracted signal to the power monitor 442. The frequency filters 431 and 432 are each a band-pass filter, for example.

The power monitor 441 measures the power of the signal output from the frequency filter 431. The power of the X-polarized light included in the polarization-multiplexed optical signal sent by the transmitting apparatus 100 can be thereby measured. The power monitor 441 outputs the measurement result to the processor 450. The power monitor 442 measures the power of the signal output from the frequency filter 432. The power of the Y-polarized light included in the polarization-multiplexed optical signal sent by the transmitting apparatus 100 can be thereby measured. The power monitor 442 outputs the measurement result to the processor 450.

The processor 450 and transmitter 460 can be used as the output section that outputs prescribed information (data) based on the intensities (powers) measured by the measuring section. The processor 450 creates prescribed information based on the power of the low-frequency signals f1 and f2, according to the measurement results sent from the power monitors 441 and 442. The prescribed information is information indicating the power of the low-frequency signals f1 and f2, for example. Alternatively, the prescribed information may indicate a difference in power between the low-frequency signals f1 and f2. Alternatively, the prescribed information may be a control command that instructs the transmitting apparatus 100 to control the difference in power between the polarized lights of the polarization-multiplexed light, the control command being created from a difference in power between the low-frequency signals f1 and f2.

The processor 450 outputs the created prescribed information to the transmitter 460. The processor 450 can be implemented by, for example, a digital signal processor (DSP) or another operation means. The transmitter 460 is a communication interface that sends (outputs) the prescribed information, output from the processor 450, to the transmitting apparatus 100. The communication system used by the transmitter 460 is not limited to optical communication; various types of communication systems such as electric communication and wireless communication can be used.

It is desirable that the frequencies of the low-frequency signals f1 and f2 be set in a frequency range in which the frequency-response characteristic curve of the photoelectric converter 410 is flat (the difference is small). Then, optical power and electric power can be easily associated with each other. This enables precise measurement of the power of the polarized lights included in the light sent by the transmitting apparatus 100. In the measuring apparatus 400 in FIG. 4A, the power splitter 420 may be replaced with an optical switch.

FIG. 4B gives a first variation of the measuring apparatus depicted in FIG. 4A. In FIG. 4B, the same elements as in FIG. 4A are denoted by the same reference numerals to eliminate duplicate descriptions. As depicted in FIG. 4B, the measuring apparatus 400 may have the photoelectric converter 410, a variable-frequency filter 470, the power monitor 441, the processor 450, and the transmitter 460. In this structure, the power splitter 420, frequency filters 431 and 432, and power monitor 442 depicted in FIG. 4A may be omitted.

The photoelectric converter 410, variable-frequency filter 470, and power monitor 441 can be used as the measuring section that measures the intensities (powers) of the low-frequency signals f1 and f2 included in the polarization-multiplexed optical signal sent by the transmitting apparatus 100. The photoelectric converter 410 outputs an electric signal, which results from photoelectric conversion, to the variable-frequency filter 470. The variable-frequency filter 470 extracts the component of a variable frequency band (central wavelength) of the signal output from the photoelectric converter 410. The frequency band from which the variable-frequency filter 470 extracts the component is controlled by the processor 450. The variable-frequency filter 470 outputs the extracted signal to the power monitor 441.

The processor 450 switches the frequency band extracted by the variable-frequency filter 470 to the frequency of the low-frequency signal f1 and the frequency of the low-frequency signal f2, and obtains the measurement result from the power monitor 441. Accordingly, the processor 450 can obtain the power of the low-frequency signals f1 and f2. Although, in the structure described above, a single variable-frequency filter 470 has been used to extract the low-frequency signals f1 and f2, a plurality of variable frequency filters may be used to extract a plurality of low-frequency signals (three or more low-frequency signals, for example).

As described above, the photoelectric converter 410, variable-frequency filter 470, and power monitor 441 can be used as the measuring section that measures the intensities of the low-frequency signals included in the polarization-multiplexed optical signal. The processor 450 and transmitter 460 can be used as the output section that outputs prescribed information (data) based on the intensities measured by the measuring section.

Figure 4C:
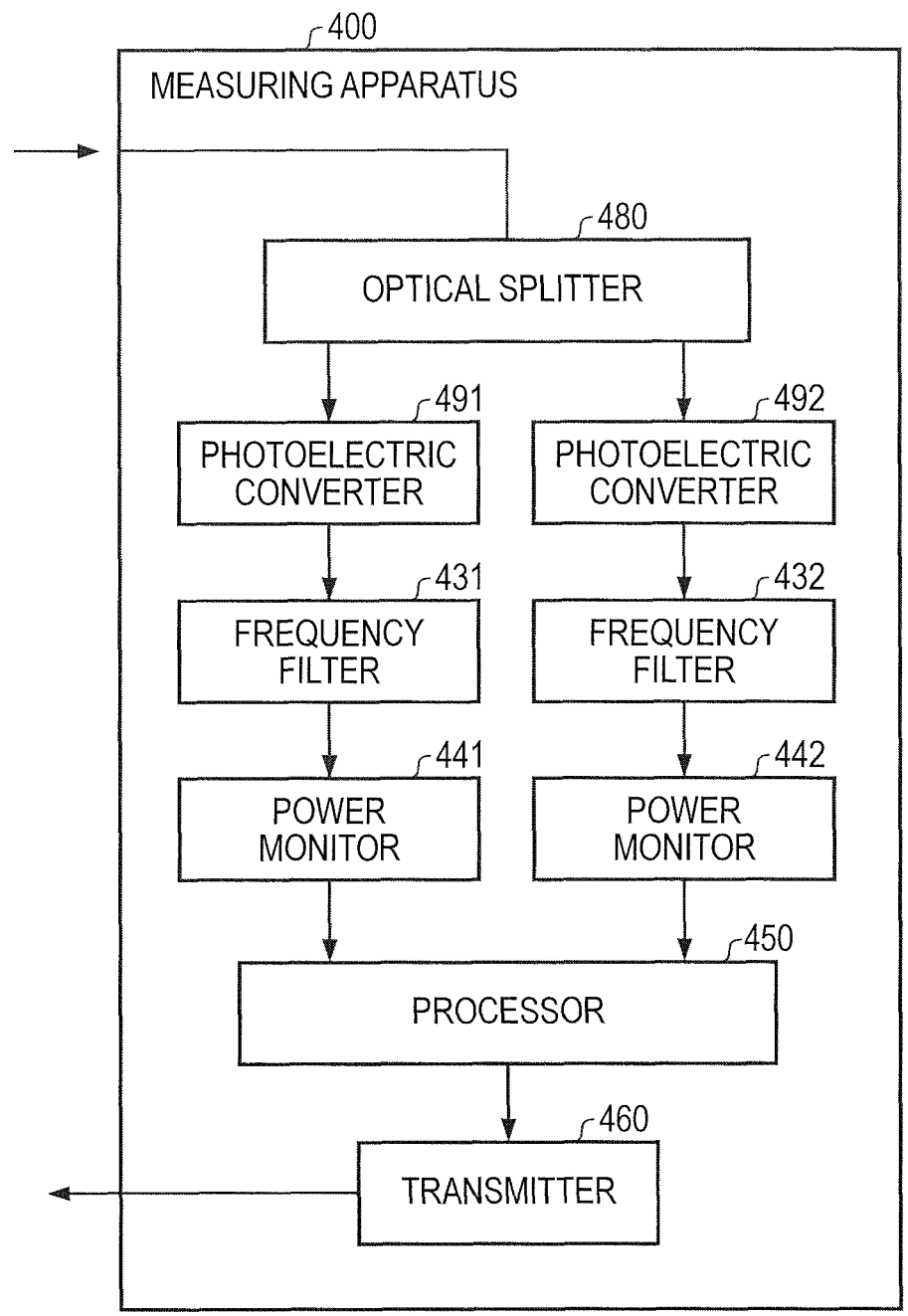
FIG. 4C illustrates a second variation of the measuring apparatus depicted in FIG. 4A.

FIG. 4C gives a second variation of the measuring apparatus depicted in FIG. 4A. In FIG. 4C, the same elements as in FIG. 4A are denoted by the same reference numerals to eliminate duplicate descriptions. As depicted in FIG. 4C, the measuring apparatus 400 may have an optical splitter 480 and photoelectric converters 491 and 492, instead of the photoelectric converter 410 and power splitter 420 in FIG. 4A. The optical splitter 480, photoelectric converters 491 and 492, frequency filters 431 and 432, and power monitors 441 and 442 can be used as the measuring section that measures the intensities (powers) of the low-frequency signals f1 and f2 included in the polarization-multiplexed optical signal sent by the transmitting apparatus 100.

Light (polarization-multiplexed optical signal) received by the measuring apparatus 400 is input to the optical splitter 480. The optical splitter 480 splits the light and outputs the split light to the photoelectric converters 491 and 492. The optical splitter 480 is an optical splitter, for example.

The photoelectric converters 491 and 492 each photoelectrically convert the relevant optical signal output from the optical splitter 480, and output an electric signal resulting from the photoelectric conversion to one of the frequency filters 431 and 432. The frequency filters 431 and 432 extract the frequency components of the signals output from the photoelectric converters 491 and 492, respectively. As described above, the signal may be split at the optical stage, instead of the electric stage. In the measuring apparatus 400 in FIG. 4C, the optical splitter 480 may be replaced with an optical switch.

FIG. 4D gives a third variation of the measuring apparatus depicted in FIG. 4A. In FIG. 4D, the same elements as in FIG. 4A are denoted by the same reference numerals to eliminate duplicate descriptions. As depicted in FIG. 4D, the measuring apparatus 400 may have a switch 493, instead of the power monitor 442 in FIG. 4A. The photoelectric converter 410, power splitter 420, frequency filters 431 and 432, switch 493, and power monitor 441 can be used as the measuring section that measures the intensities (powers) of the low-frequency signals f1 and f2 included in the polarization-multiplexed optical signal sent by the transmitting apparatus 100.

The frequency filters 431 and 432 each output an extracted signal to the switch 493. The switch 493 outputs one of the signals output from the frequency filters 431 and 432 to the power monitor 441. The selection of a signal to be output from the switch 493 is controlled by the processor 450.

The power monitor 441 measures the power of the signal output from the switch 493, and outputs the measurement result to the processor 450. The processor 450 makes a switchover between the signals output from the frequency filters 431 and 432 to select a signal to be output from the switch 493, and obtains the measurement result from the power monitor 441. Accordingly, the processor 450 can obtain the power of the low-frequency signal f1 and the power of the low-frequency signal f2. In the measuring apparatus 400 in FIG. 4D, the power splitter 420 may be replaced with an optical switch. In this case, the switch 493 may be replaced with a power combiner.

Figure 4E:
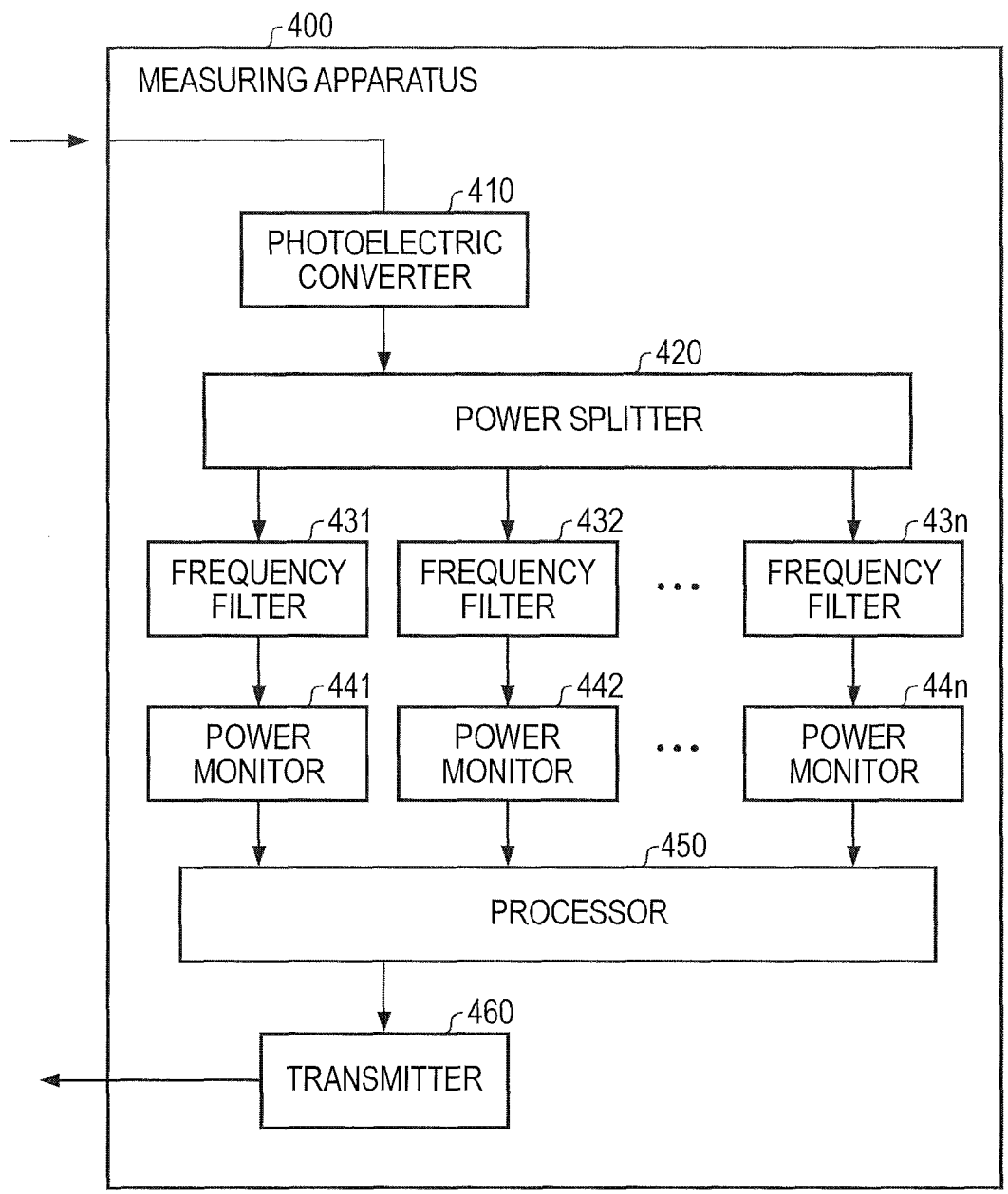
FIG. 4E illustrates a fourth variation of the measuring apparatus depicted in FIG. 4A.

FIG. 4E gives a fourth variation of the measuring apparatus depicted in FIG. 4A. In FIG. 4E, the same elements as in FIG. 4A are denoted by the same reference numerals to eliminate duplicate descriptions. As depicted in FIG. 4E, the measuring apparatus 400 may have n number of frequency filters 431 to 43n (n=3, 4, 5, 6, . . . ) and n number of power monitors 441 to 44n, instead of the structure in FIG. 4A. The measuring apparatus 400 may have three or more frequency filters and three or more power monitors in this way. Similarly, the measuring apparatus 400 in FIGS. 4B and 4C may have three or more photoelectric converters, three or more frequency filters, three or more power monitors, and the like.

Figure 5:
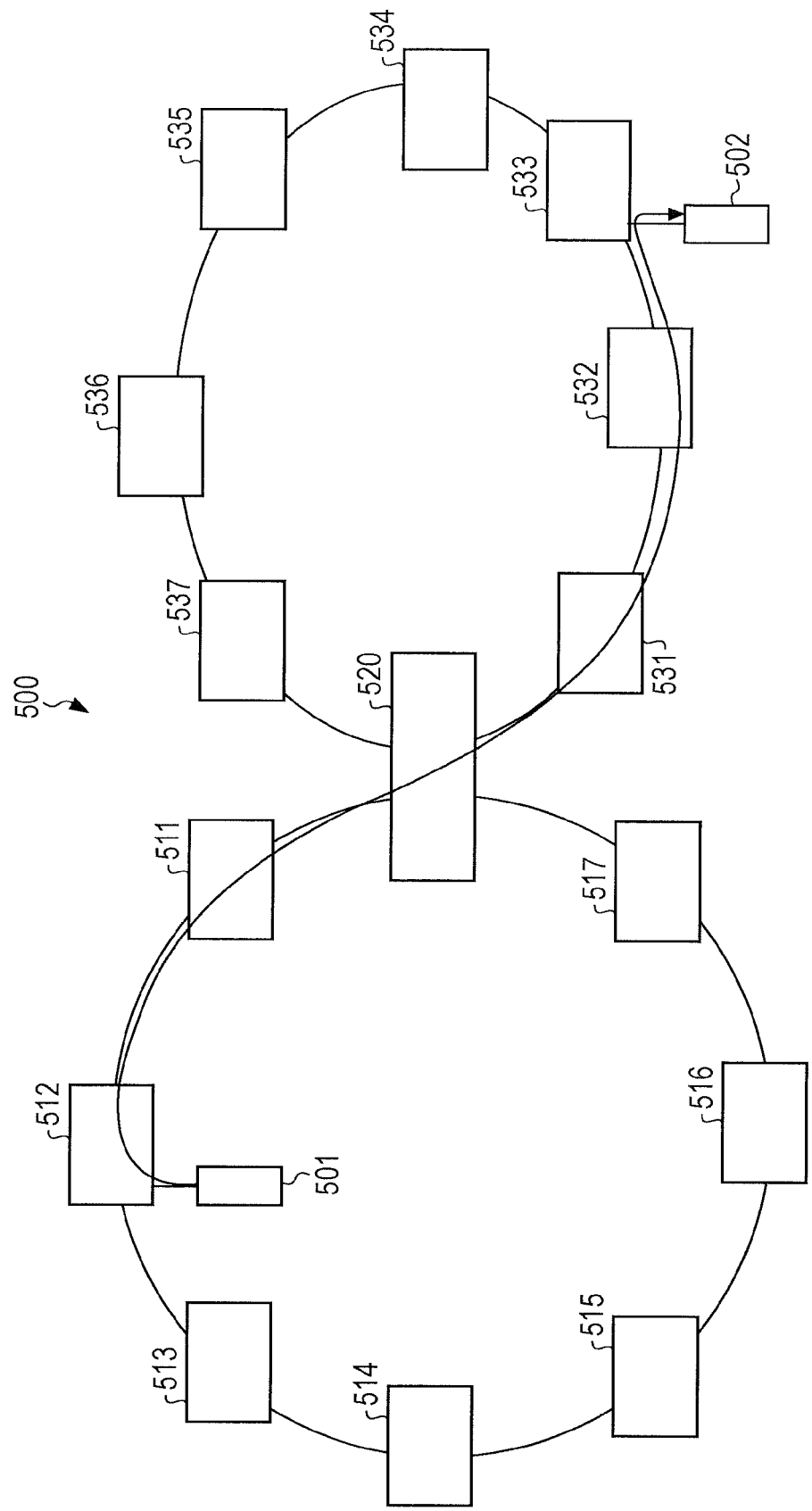
FIG. 5 illustrates an example of a communication system.

FIG. 5 gives an example of a communication system. As depicted in FIG. 5, the communication system 500 includes nodes 511 to 517, 520, and 531 to 537. The nodes 511 to 517 and 520 form a ring-shaped network, and the nodes 520 and 531 to 537 also form a ring-shaped network. Therefore, the node 520 is a hub node that mutually connects the two ring-shaped networks.

A case will be described as an example, in which a transmitting apparatus 501 is connected to the node 512, the nodes 511, 520, 531, and 532 are relay nodes, and a receiving apparatus 502 is connected to the node 533. In this case, the transmitting apparatus 100 in FIG. 1, for example, can be used as the transmitting apparatus 501. The measuring apparatus 400 in FIG. 4 may be provided in the node 511, 520, 531, 532, or 533. A path on which the polarization-multiplexed optical signal is transferred is set between the transmitting apparatus 501 and the receiving apparatus 502.

Figure 6:
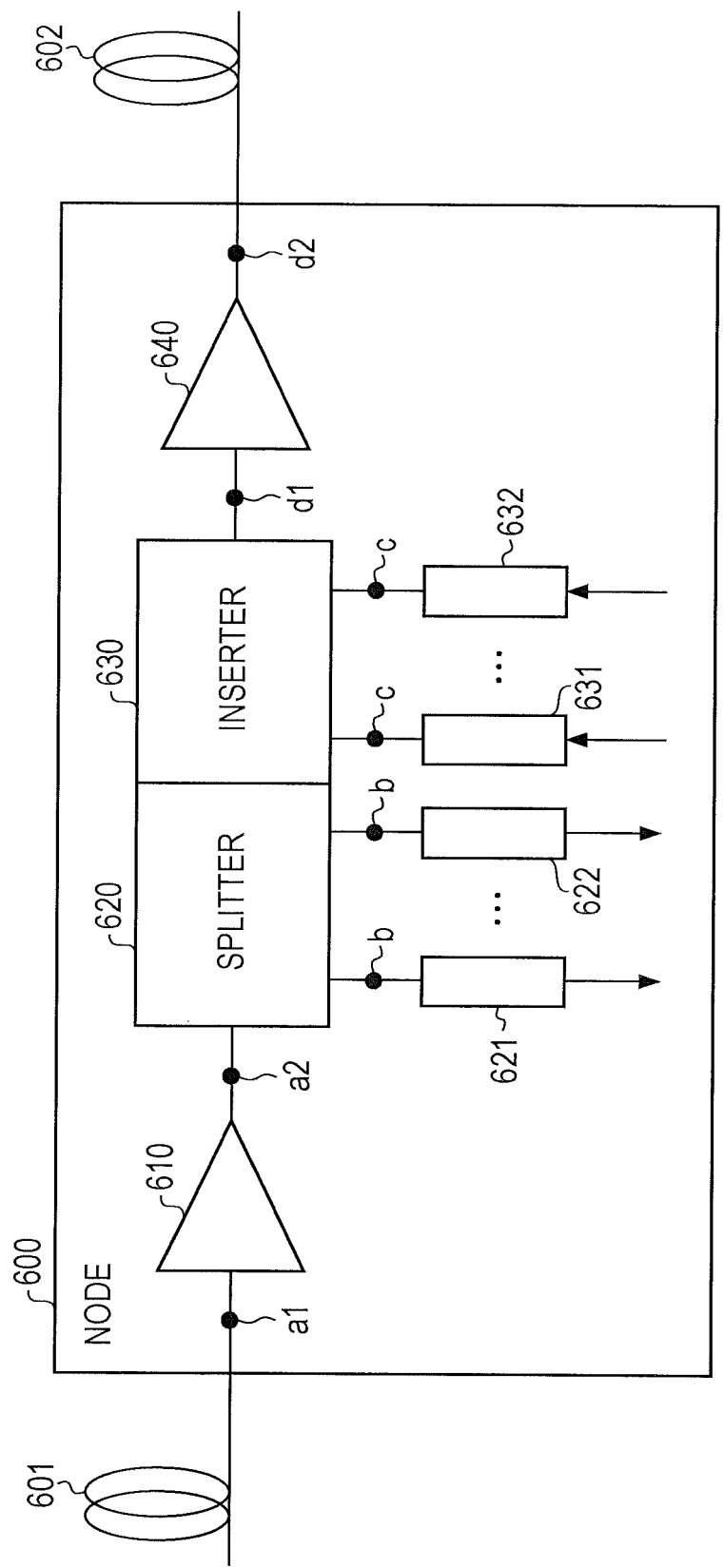
FIG. 6 illustrates an example in which a measuring apparatus is disposed in a node.

FIG. 6 gives an example in which a measuring apparatus is disposed in a node. The node 600 in FIG. 6 is an exemplary node in which the measuring apparatus 400 is installed (the node 600 is any one of the nodes 511, 520, 531, 532, and 533 depicted in FIG. 5, for example). The node 600 has an amplifier 610, a splitter 620, receivers 621 and 622, transmitters 631 and 632, an inserter 630, and an amplifier 640. The amplifier 610 receives light (wavelength-multiplexed optical signal) from the node in front through a transmission line 601. The amplifier 610 then amplifies the received light and outputs the amplified light to the splitter 620.

The splitter 620 selects light (optical signal) with any wavelength components included in the light output from the amplifier 610 and outputs (drops) the selected light (optical signal) to the receivers 621 and 622. The splitter 620 also outputs light (optical signal) with the remaining components to the inserter 630. The receivers 621 and 622 receive the light (optical signal) output from the splitter 620. The transmitters 631 and 632 outputs light (optical signal) with any wavelengths to the inserter 630.

The inserter 630 performs insertion (addition) by wavelength-multiplexing the light (optical signal) output from the splitter 620 with the light (optical signal) output from the transmitters 631 and 632. That is, the inserter 630 outputs, to the amplifier 640, wavelength-multiplexed light that includes the light (optical signal) output from the splitter 620 and the light (optical signal) output from the transmitters 631 and 632. The amplifier 640 amplifies the light (optical signal) output from the inserter 630 and outputs the amplified light. The light output (optical signal) from the amplifier 640 is output to a node behind the amplifier 640 through a transmission line 602.

For example, a splitter that splits light at any one of measurement points a1, a2, b, c, d1, and d2 in the node 600 is provided, and the light split by the splitter is input to the measuring apparatus 400 in FIG. 4A. Then, the power of the low-frequency signals f1 and f2 included in the light (polarization-multiplexed optical signal) sent from the transmitting apparatus 501 (or transmitting apparatus 100) can be measured.

Figure 7:
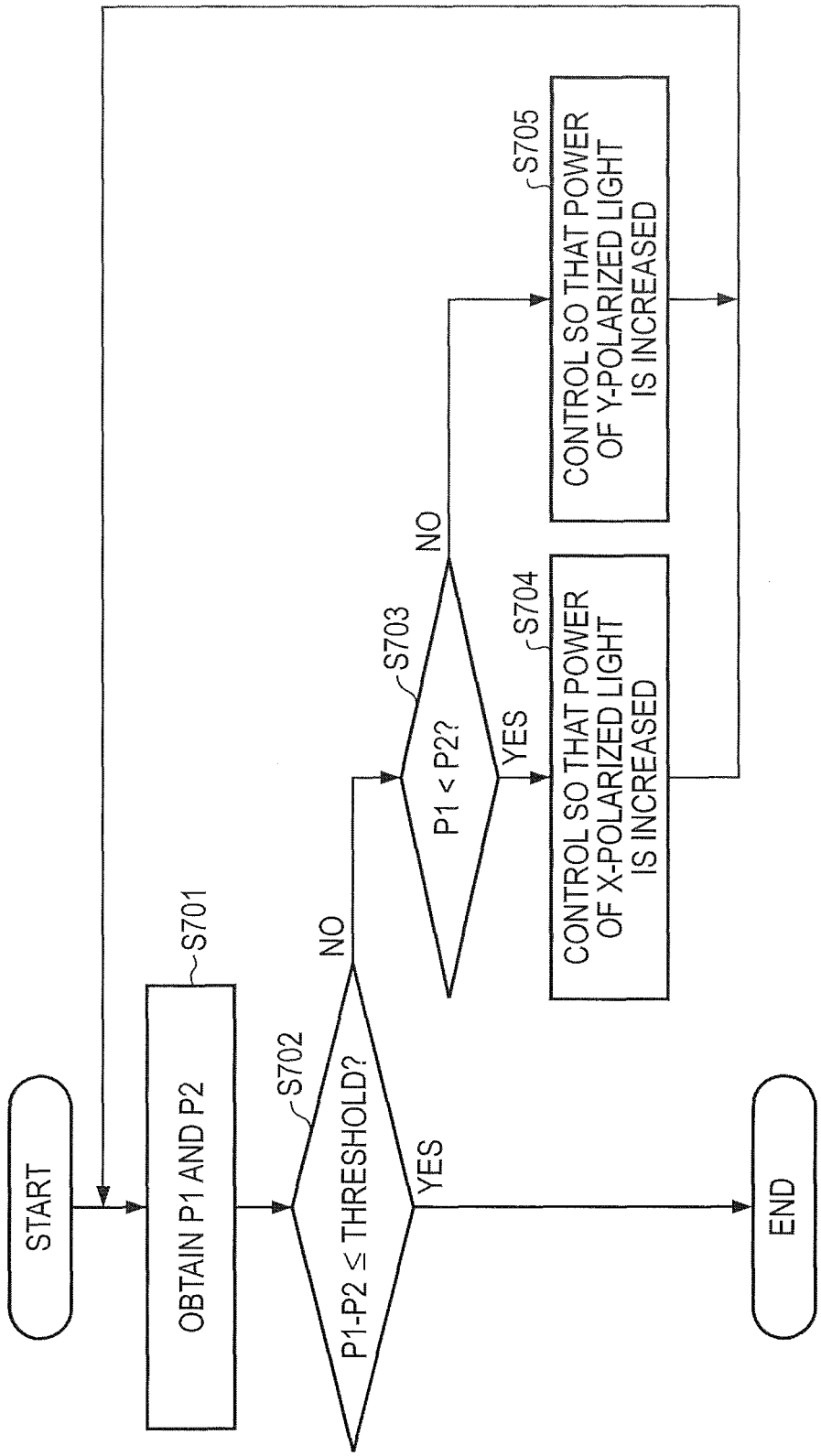
FIG. 7 is a flowchart illustrating an example of control performed by the transmitting apparatus depicted in FIG. 1.

FIG. 7 is a flowchart illustrating an example of control performed by the transmitting apparatus depicted in FIG. 1. The controller 170 included in transmitting apparatus 100 in FIG. 1 repeatedly executes, for example, the operations in FIG. 7. In this example, the prescribed information (data) sent from the measuring apparatus 400 to the transmitting apparatus 100 indicates the power of the low-frequency signals f1 and f2.

First, the controller 170 obtains the power P1 of the low-frequency signal f1 and the power P2 of the low-frequency signal f2 according to the prescribed information from the receiver 160 (S701). The controller 170 then determines whether the difference (P1−P2) between the power P1 and the power P2 obtained in S701 is equal to or smaller than a threshold (S702).

If the difference between the power P1 and the power P2 is equal to or smaller than the threshold in S702 (the result in S702 is Yes), then the controller 170 terminates a series of processes. If the difference between the power P1 and the power P2 is greater than the threshold (the result in S702 is No), then the controller 170 determines whether the power P1 is smaller than the power P2 (S703).

If the power P1 is smaller than the power P2 in S703 (the result in S703 is Yes), then the controller 170 controls the polarization rotator 120 so that the power of the X-polarized light is increased (S704) and returns to S701. In S704, the power of the X-polarized light can be increased by, for example, changing the rotational angle through which the polarized light is rotated by the polarization rotator 120 toward 0 degree in the example given in FIG. 3.

If the power P1 is not smaller than the power P2 in S703 (the result in S703 is No), then the controller 170 controls the polarization rotator 120 so that the power of the Y-polarized light is increased (S705) and returns to S701. In S705, the power of the Y-polarized light can be increased by, for example, changing the rotational angle through which the polarized light is rotated by the polarization rotator 120 toward 90 degrees in the example given in FIG. 3. In the above operations, the controller 170 can control the difference in power between the polarized lights of the polarization-multiplexed optical signal so that the difference in power (P1−P2) between the polarized lights, measured in the measuring apparatus 400, is equal to or smaller than the threshold.

The above operations may be executed by the processor 450 in the measuring apparatus 400. In this case, the processor 450 obtains the power P1 and power P2 from the power monitors 441 and 442 (in the case of the example in FIG. 4A) according to the monitoring result, in S701.

In S704, the processor 450 sends, to the transmitting apparatus 100 as the prescribed information, a control command instructing it to control the polarization rotator 120 so as to increase the power of the X-polarized light. In S705, the processor 450 also sends, to the transmitting apparatus 100 as the prescribed information, a control command instructing it to control the polarization rotator 120 so as to decrease the power of the X-polarized light.

Figure 8A:
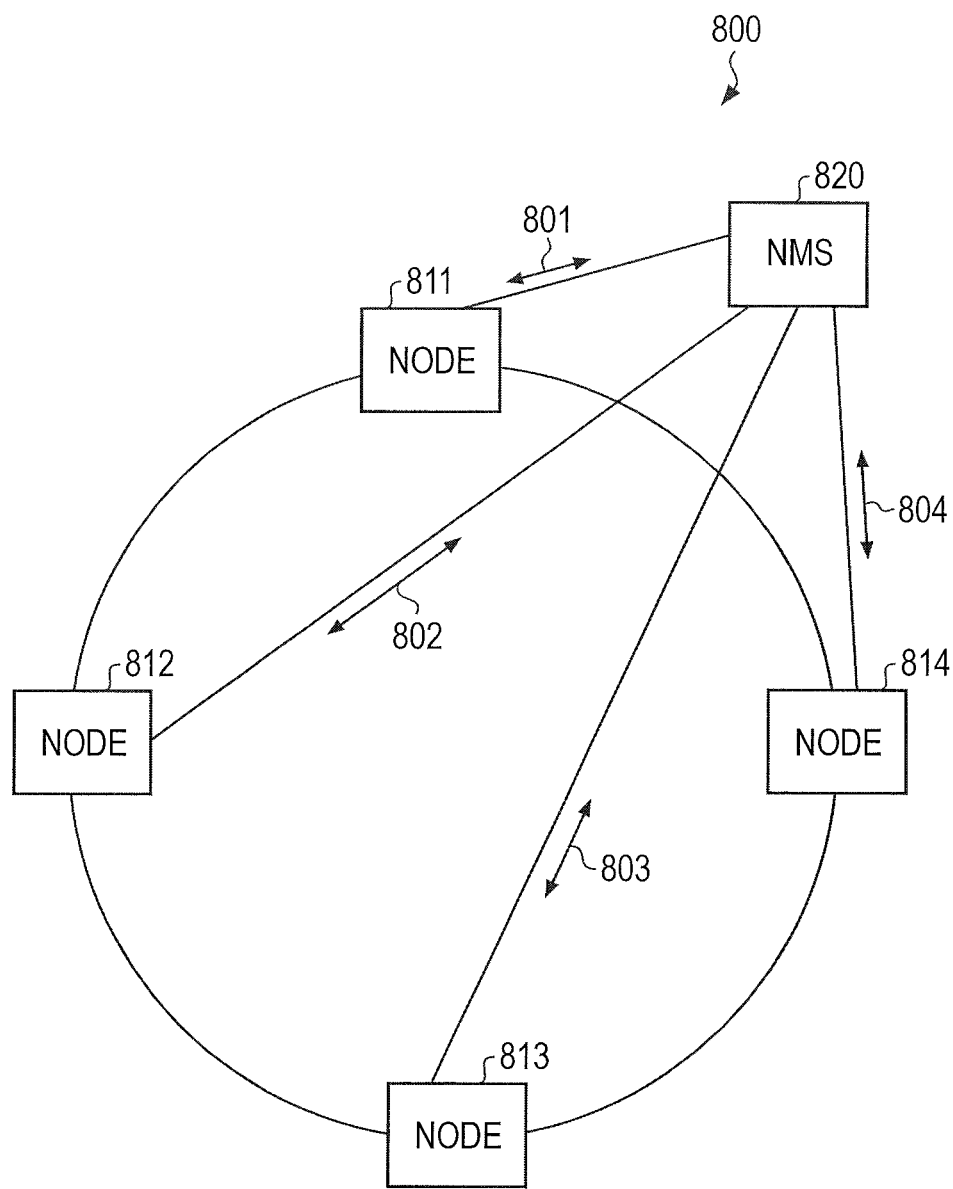
FIG. 8A illustrates an example of transmitting and receiving prescribed information.

FIG. 8A illustrates an example of transmitting and receiving the prescribed information. The communication system 800 in FIG. 8A is implemented by simplifying the communication system 500 in FIG. 5. The communication system 800 includes notes 811 to 814. The nodes 811 to 814 are connected to an NMS 820 (NMS: network management system) that manages the optical communication in the communication system 800. The nodes 811 to 814 transmit and receive monitoring control signals 801 to 804 to and from the NMS 820. The prescribed information described above, which is transmitted and received among the nodes 811 to 814, can be transmitted and received by the monitoring control signals 801 to 804.

Figure 8B:
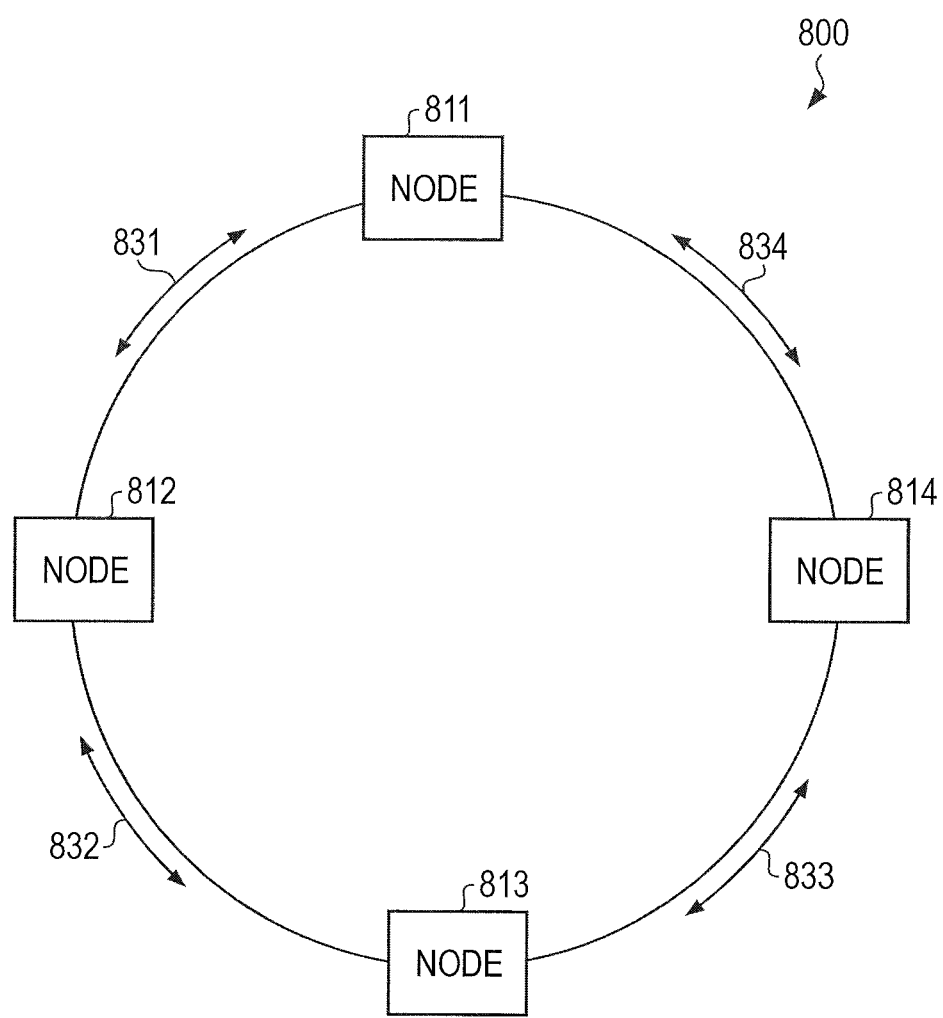
FIG. 8B illustrates another example of transmitting and receiving prescribed information.

FIG. 8B illustrates another example of transmitting and receiving the prescribed information. In FIG. 8B, the same elements as in FIG. 8A are denoted by the same reference numerals to eliminate duplicate descriptions. As illustrated in FIG. 8B, the nodes 811 to 814 mutually transmit and receive optical supervisory channels (OSCs) 831 to 834. The prescribed information described above, which is transmitted and received among the nodes 811 to 814, can be transmitted and received by the OSCs 831 to 834.

FIG. 9A illustrates an example of optical power characteristics in a transmission line. N1 to N3 on the horizontal axis in FIG. 9A indicate the nodes on the transmission line through which light (polarization-multiplexed optical signal) is transmitted from the transmitting apparatus 501 in FIG. 5 to the receiving apparatus 502. For example, N1 corresponds to the node 512, N2 corresponds to any one of the nodes 511, 520, 531, and 532, and N3 corresponds to the node 533. The vertical axis in FIG. 9A indicates the power of light.

The characteristic line 901 indicates the power characteristic of the X-polarized light included in polarization-multiplexed optical signal transmitted from the transmitting apparatus 501 to the receiving apparatus 502. The characteristic line 902 indicates the power characteristic of the Y-polarized light included in polarization-multiplexed optical signal transmitted from the transmitting apparatus 501 to the receiving apparatus 502.

Figure 9C:
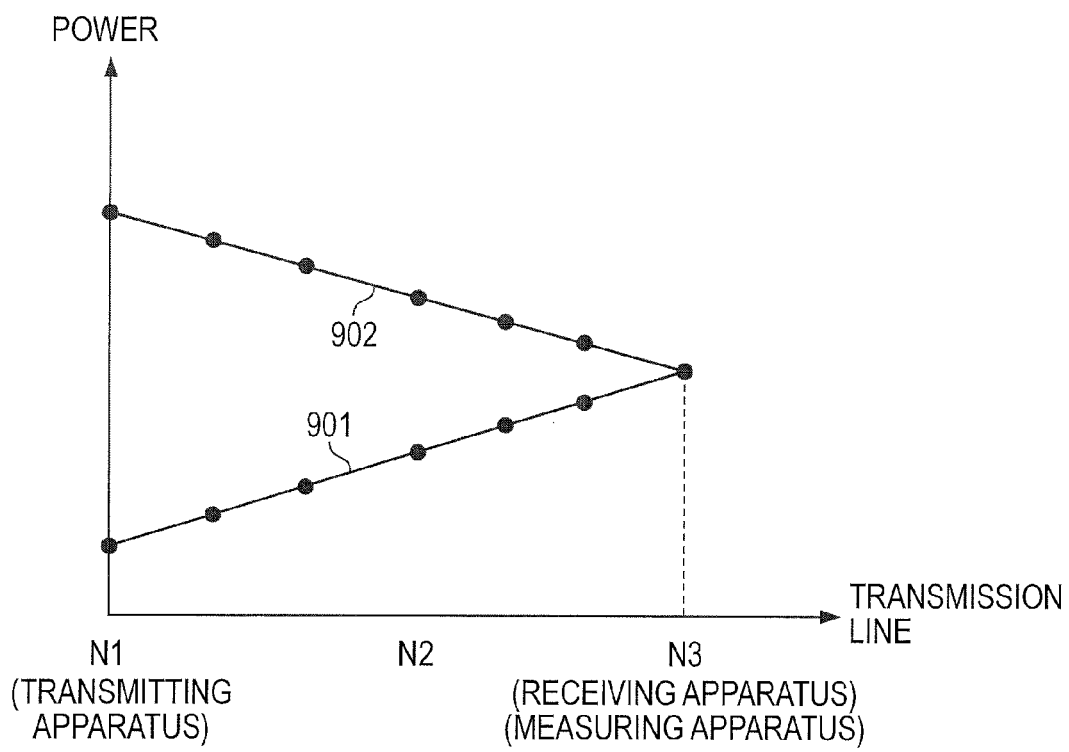
FIG. 9C illustrates a second control example of a difference in power between polarized signals.

In the example in FIG. 9A, since there is an effect by a PDL, as the transmission distance is prolonged, the power of the X-polarized light is increased and the power of the Y-polarized light is decreased (this is also true in FIGS. 9B and 9C). In FIG. 9A, the power of the X-polarized light and the power of the Y-polarized light included in the polarization-multiplexed optical signal are the same at the time when the polarization-multiplexed optical signal is transmitted from the transmitting apparatus 100.

In the example in FIG. 9A, therefore, as the transmission distance is prolonged, the difference in power between the X-polarized light and the Y-polarized light is increased. This results in an increase in a power difference 911 between the X-polarized light and the Y-polarized light at the receiving apparatus 502 disposed in N3, and the X-polarized light and Y-polarized light may not fall within a reception dynamic range of the receiving apparatus 502.

A large difference 920 is caused between average power 921 of the X-polarized light and average power 922 of the Y-polarized light. Accordingly, the optical signal noise ratio (OSNR) of the X-polarized light or Y-polarized light, whichever has smaller average power (in this example, the Y-polarized light), is lowered and its bit error rate (BER) is increased.

The transmission quality of the X-polarized light or Y-polarized light, whichever has higher average power (in this example, X-polarized light), is largely deteriorated because of the effect of fiber's non-linearity, and its BER is increased. Thus, if the X-polarized light and Y-polarized light included in the light (polarization-multiplexed optical signal) are the same at the time when the light is transmitted from the transmitting apparatus 100, the transmission quality of the receiving apparatus 502 is deteriorated because of a PDL. Transmission quality deterioration caused by a PDL is disclosed in, for example, O. Vassilieva et al. "Impact of Polarization Dependent Loss and Cross-Phase Modulation on Polarization Multiplexed DQPSK Signals", OFC/NFOEC, 2008.

FIG. 9B gives a first control example of a difference in power between polarized lights. In FIG. 9B, the same elements as in FIG. 9A are denoted by the same reference numerals to eliminate duplicate descriptions. The measuring apparatus 400 is provided in, for example, N2 (intermediate node), and the transmitting apparatus 100 controls a difference in power between polarized lights so that a difference in power between the X-polarized light and Y-polarized light, measured in the measuring apparatus 400, is minimized. Then, the difference in power between the X-polarized light and the Y-polarized light at N2 (intermediate node) can be minimized, as illustrated in FIG. 9B.

In this example, the average power 921 of the X-polarized light and the average power 922 of the Y-polarized light can be substantially the same. This enables suppression of the above-mentioned OSNR drop and the transmission quality deterioration caused by the effect of fiber's non-linearity.

FIG. 9C gives a second control example of a difference in power between polarized lights. In FIG. 9C, the same elements as in FIG. 9A are denoted by the same reference numerals to eliminate duplicate descriptions. The measuring apparatus 400 is provided in, for example, N3 (reception node), and the transmitting apparatus 100 controls a difference in power between polarized lights so that a difference in power between the X-polarized light and Y-polarized light, measured in the measuring apparatus 400, is minimized. Then, the difference in power between the X-polarized light and the Y-polarized light at N3 (reception node) can be minimized, as illustrated in FIG. 9C.

In this example, the power of the X-polarized light and the power of the Y-polarized light in the receiving apparatus 502 can be substantially the same. Accordingly, the X-polarized light and Y-polarized light can be easily placed within the reception dynamic range of the receiving apparatus 502. Although control examples for a difference in power between polarized lights have been illustrated in FIGS. 9B and 9C, control of a difference in power between polarized lights is not limited to these examples; various variations can be made in the communication system 500 to meet demanded conditions.

Figure 10A:
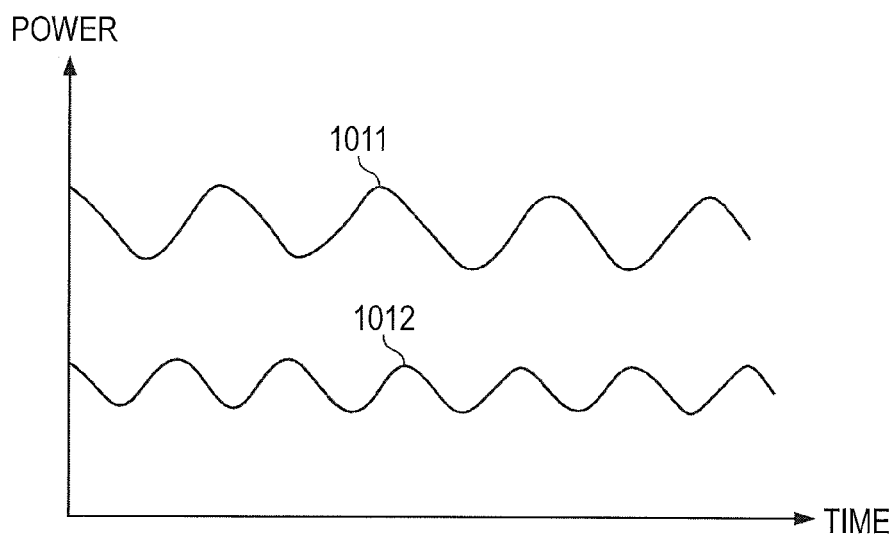
FIG. 10A illustrates a first example of the waveform of a low-frequency signal supplied to the measuring apparatus.

FIG. 10A illustrates a first example of the waveform of a low-frequency signal to be supplied to the measuring apparatus. In FIG. 10A, the horizontal axis indicates time and the vertical axis indicates power. The example in FIG. 10A indicates a state before the transmitting apparatus 100 controls a power difference between polarized lights. The waveform 1011 is the waveform of the low-frequency signal f1 included in the light (polarization-multiplexed optical signal) to be supplied to the measuring apparatus 400. The waveform 1012 is the waveform of the low-frequency signal f2 included in the light to be supplied to the measuring apparatus 400.

As illustrated in FIG. 10A, in a state before the transmitting apparatus 100 controls the power difference between polarized lights, there is a difference in power between the low-frequency signals f1 and f2 included in the light to be supplied to the measuring apparatus 400, the difference being caused by a PDL, so it is found that there is a difference in power between the polarized lights of the light to be supplied to the measuring apparatus 400.

Figure 10B:
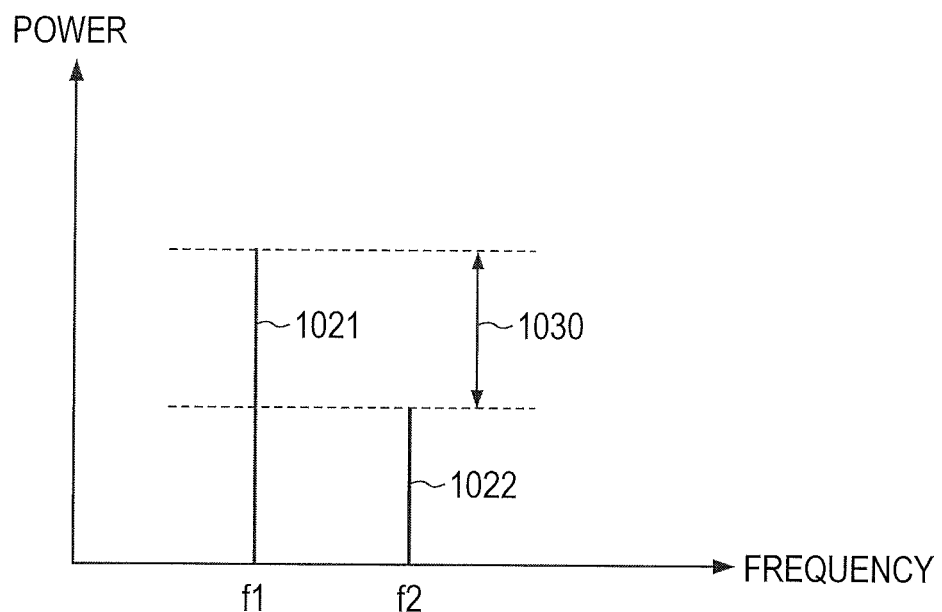
FIG. 10B illustrates a first example of the spectrum of a low-frequency signal supplied to the measuring apparatus.

FIG. 10B illustrates a first example of the spectrum of a low-frequency signal supplied to the measuring apparatus. In FIG. 10B, the horizontal axis indicates frequency and the vertical axis indicates power. The spectrum 1021 corresponds to the waveform 1011 of the low-frequency signal f1 in FIG. 10A. The spectrum 1022 corresponds to the waveform 1012 of the low-frequency signal f2 in FIG. 10A. A power difference 1030 is a difference in power between the spectrum 1021 and the spectrum 1022.

The measuring apparatus 400 measures the power difference 1030 and sends a control signal, which is based on the measurement result, to the transmitting apparatus 100. The transmitting apparatus 100 controls the power difference between the polarized lights according to the control signal sent from the measuring apparatus 400 so that, for example, the power difference 1030 is reduced.

Figure 11A:
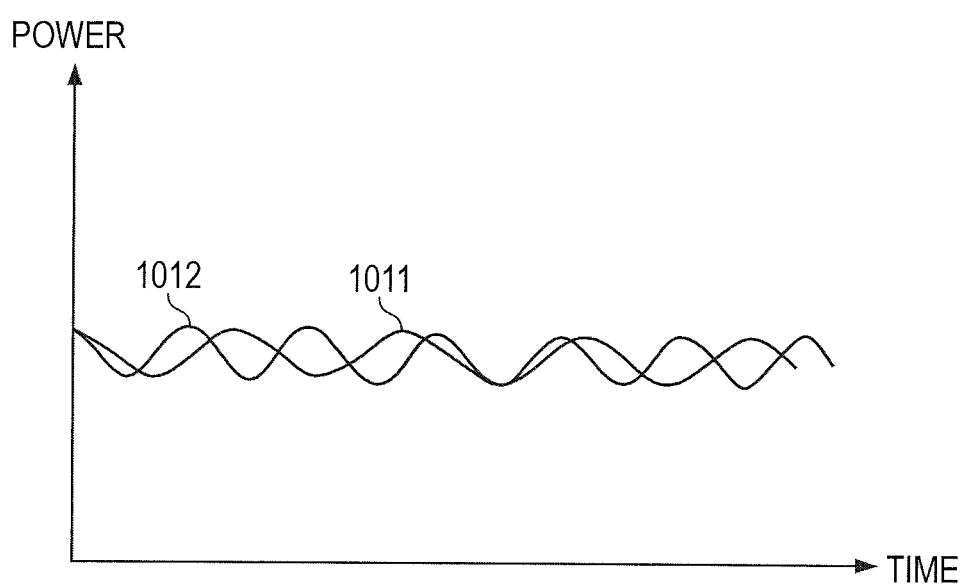
FIG. 11A illustrates a second example of the waveform of a low-frequency signal supplied to the measuring apparatus.

FIG. 11A illustrates a second example of the waveform of a low-frequency signal supplied to the measuring apparatus. In FIG. 11A, the same elements as in FIG. 10A are denoted by the same reference numerals to eliminate duplicate descriptions. The example in FIG. 11A indicates a state after the transmitting apparatus 100 has controlled a power difference between polarized lights.

Figure 11B:
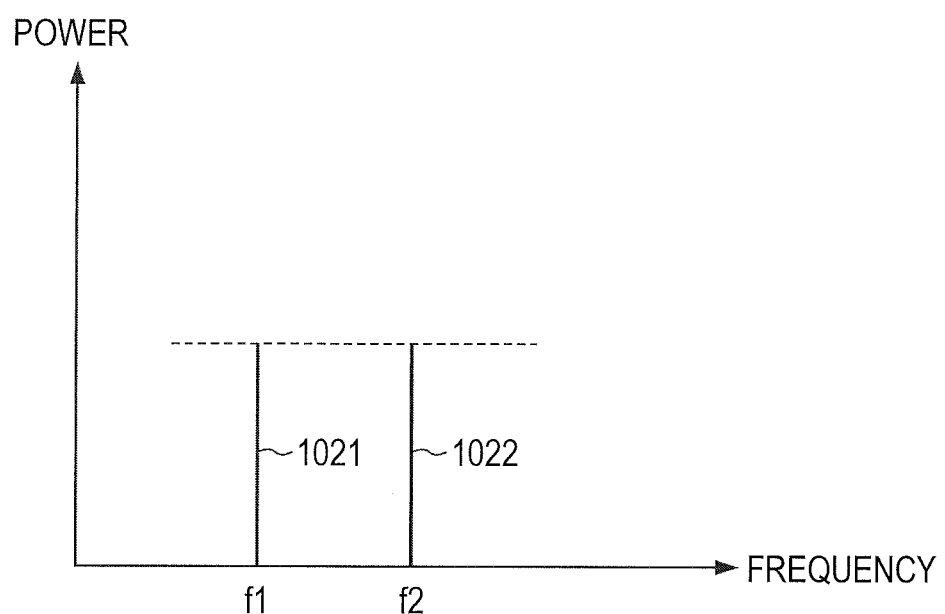
FIG. 11B illustrates a second example of the spectrum of a low-frequency signal supplied to the measuring apparatus.

FIG. 11B illustrates a second example of the spectrum of a low-frequency signal supplied to the measuring apparatus. In FIG. 11B, the same elements as in FIG. 10B are denoted by the same reference numerals to eliminate duplicate descriptions. The spectrum 1021 in FIG. 11B corresponds to the waveform 1011 of the low-frequency signal f1 in FIG. 11A. The spectrum 1022 in FIG. 11B corresponds to the waveform 1012 of the low-frequency signal f2 in FIG. 11A.

As illustrated in FIGS. 11A and 11B, when the transmitting apparatus 100 controls a difference in power between polarized lights, the power of each polarized light included in light (polarization-multiplexed optical signal) to be supplied to the measuring apparatus 400 can be substantially the same. However, this is not a limitation on power difference control by the transmitting apparatus 100 between polarized lights; the difference in power in the polarized lights included in the light to be supplied to the measuring apparatus 400 can be controlled so that the difference falls within a prescribed range.

FIG. 12 gives a first variation of the transmitting apparatus depicted in FIG. 1. In FIG. 12, the same elements as in FIG. 1 are denoted by the same reference numerals to eliminate duplicate descriptions. As depicted in FIG. 12, the transmitting apparatus 100 may have a polarization controller 1210 instead of the polarization rotator 120 in FIG. 1. In this case, the LD 110 is connected to the polarization splitter 130. The polarization combiner 150 outputs combined light to the polarization controller 1210.

The polarization controller 1210 adjusts the polarized light of the light output from the polarization combiner 150. The polarization controller 1210 can be implemented by, for example, a half-wave plate. Then, the polarization controller 1210 operates as a polarization rotator and can change the polarization direction of the light. Alternatively, the polarization controller 1210 may be implemented by a combination of a half-wave plate and a quarter-wave plate. Then, the polarization controller 1210 can change the polarization direction and polarization state of the light can be changed.

The adjustment of the polarized light of the light by the polarization controller 1210 is controlled by the controller 170. Specifically, the polarization controller 1210 outputs the light (polarization-multiplexed optical signal) for which its polarized light has been adjusted to a stage behind of the transmitting apparatus 100. The controller 170 then controls the adjustment of the polarized light by the polarization controller 1210, according to the prescribed information output from the receiver 160.

Figure 13:
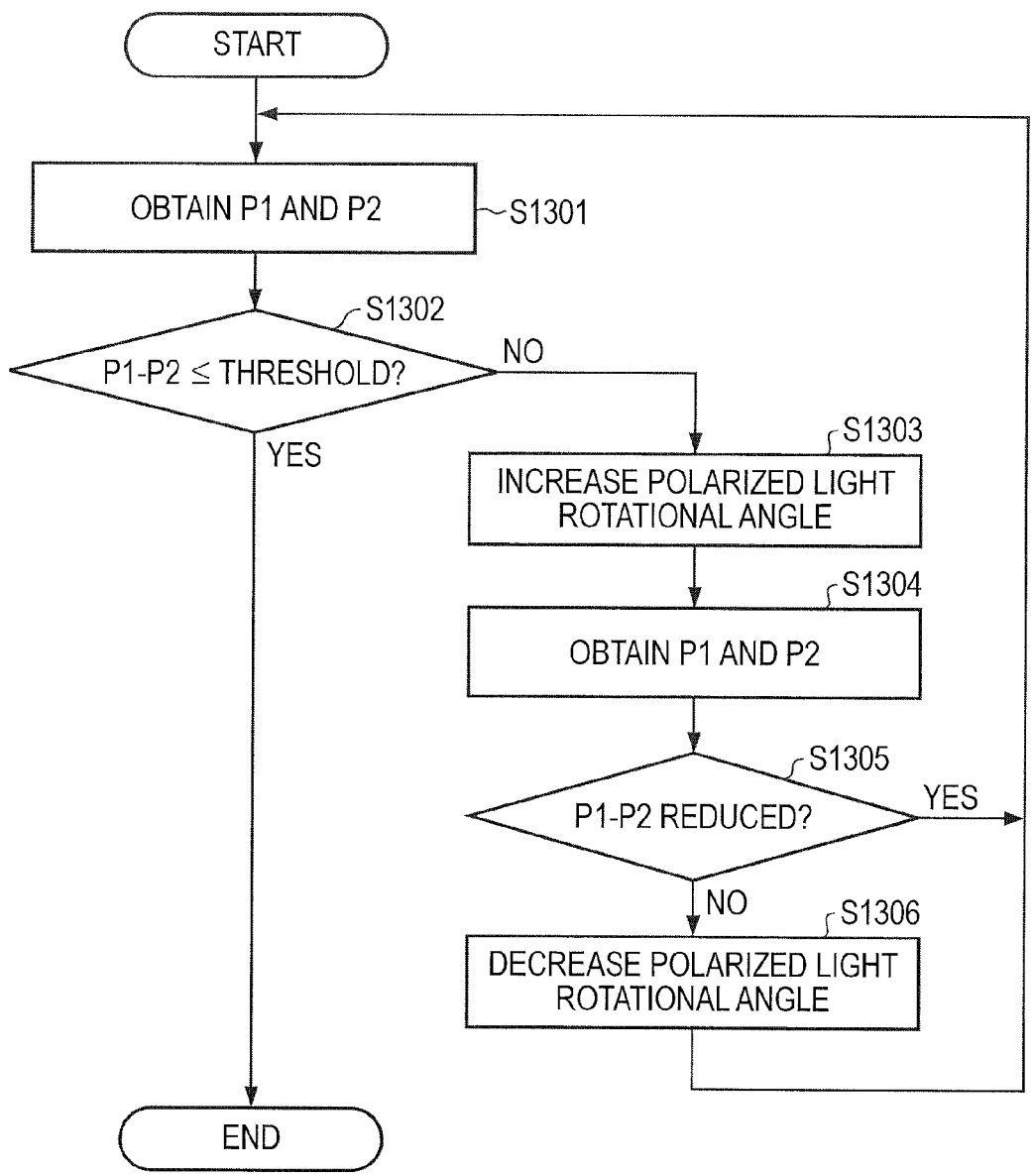
FIG. 13 is a flowchart illustrating an example of control performed by the transmitting apparatus depicted in FIG. 12.

FIG. 13 is a flowchart illustrating an example of control performed by the transmitting apparatus depicted in FIG. 12. The controller 170 included in transmitting apparatus 100 in FIG. 12 repeatedly executes, for example, the operations in FIG. 13. A case in which the polarization controller 1210 changes the polarization direction of light (the polarization state remains unchanged) will be described with reference to FIG. 13.

First, the controller 170 obtains the power P1 of the X-polarized light and the power P2 of the Y-polarized light according to the prescribed information (data) from the receiver 160 (S1301). The controller 170 then determines whether the difference (P1−P2) between the power P1 and the power P2 obtained in S1301 is equal to or smaller than a threshold (S1302).

If the difference between the power P1 and the power P2 is equal to or smaller than the threshold in S1302 (the result in S1302 is Yes), then the controller 170 terminates a series of processes. If the difference between the power P1 and the power P2 is greater than the threshold (the result in S1302 is No), then the controller 170 increases the rotational angle through which the polarized light is rotated by the polarization controller 1210 (S1303). The controller 170 then obtains the power P1 of the X-polarized light and the power P2 of the Y-polarized light according to the prescribed information from the receiver 160 (S1304).

The controller 170 then determines whether the difference between the power P1 and power P2 obtained in S1304 is smaller than the difference between the power P1 and power P2 obtained in S1301 (S1305).

If the difference between the power P1 and the power P2 has been reduced in S1305 (the result in S1305 is Yes), the controller 170 returns to S1301. If the difference between the power P1 and the power P2 has not been reduced (the result in S1305 is No), the controller 170 decreases the rotational angle through which the polarized light is rotated by the polarization controller 1210 (S1306) and returns to S1301. In the above operations, the controller 170 can control the polarization states of the polarized lights of polarization-multiplexed optical signal so that the difference in power (P1−P2) between the polarized lights, measured in the measuring apparatus 400, is equal to or smaller than the threshold.

The above operations may be executed by the processor 450 in the measuring apparatus 400. In this case, the processor 450 obtains the power P1 and power P2 from the power monitors 441 and 442 (in the case of the example in FIG. 4A) according to the monitoring result, in S1301 and S1304. In S1303, the processor 450 sends, to the transmitting apparatus 100 as the prescribed information, a control command instructing it to control the polarization controller 1210 so as to increase the rotational angle of the polarized light. In S1306, the processor 450 also sends, to the transmitting apparatus 100 as the prescribed information, a control command instructing it to control the polarization controller 1210 so as to decrease the rotational angle of the polarized light.

Figure 14:
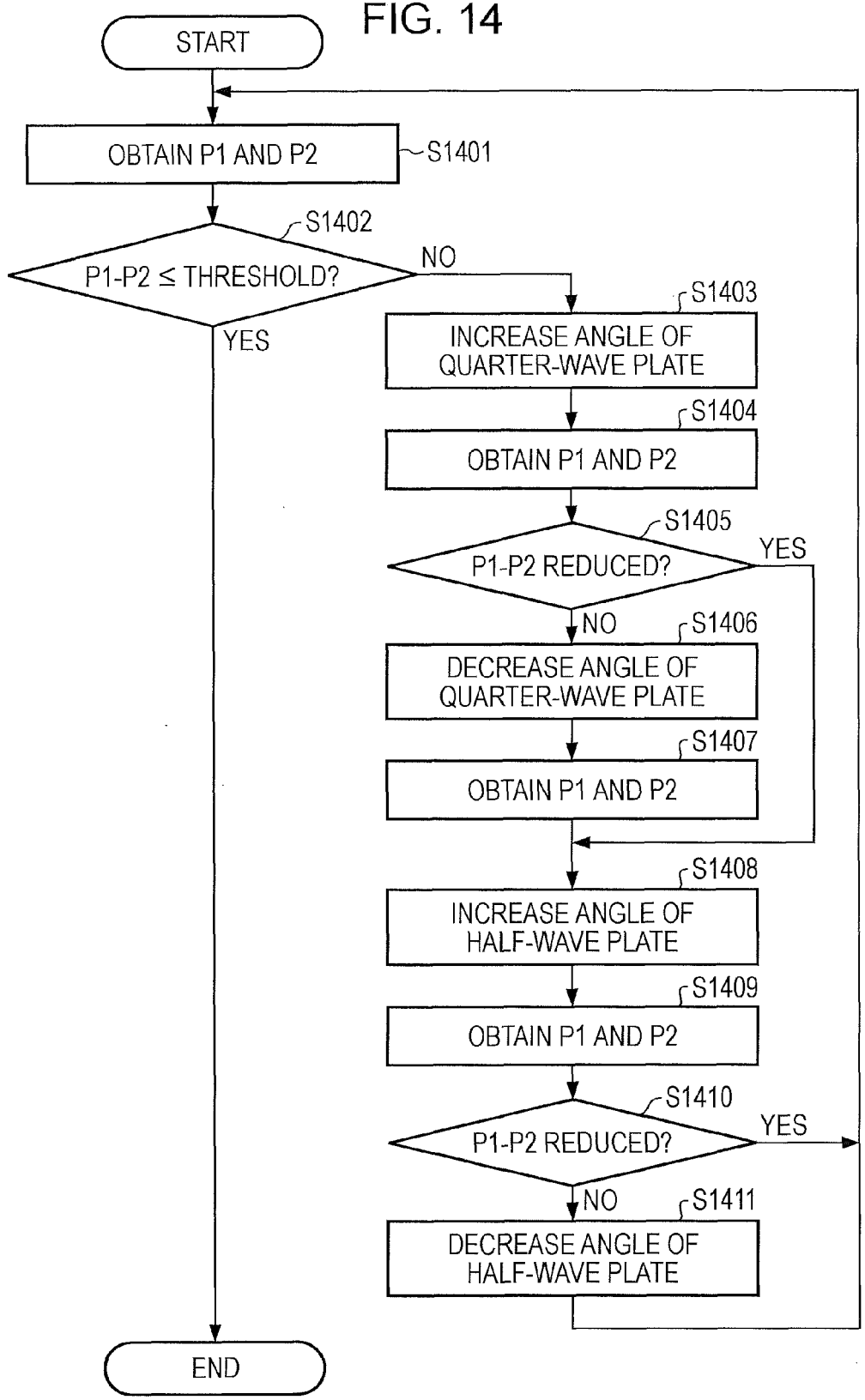
FIG. 14 is a flowchart illustrating another example of control performed by the transmitting apparatus depicted in FIG. 12.

FIG. 14 is a flowchart illustrating another example of control performed by the transmitting apparatus depicted in FIG. 12. The controller 170 included in transmitting apparatus 100 in FIG. 12 may repeatedly execute, for example, the operations in FIG. 14. A case in which the polarization controller 1210 changes the polarization direction and polarization state of light will be described with reference to FIG. 14. Therefore, the polarization controller 1210 is assumed to have been implemented by a combination of a half-wave plate and a quarter-wave plate.

First, the controller 170 obtains the power P1 of the X-polarized light and the power P2 of the Y-polarized light according to prescribed information (data) from the receiver 160 (S1401). The controller 170 then determines whether the difference (P1−P2) between the power P1 and the power P2 obtained in S1401 is equal to or smaller than a threshold (S1402).

If the difference between the power P1 and the power P2 is equal to or smaller than the threshold in S1402 (the result in S1402 is Yes), then the controller 170 terminates a series of processes. If the difference between the power P1 and the power P2 is greater than the threshold (the result in S1402 is No), then the controller 170 increases the angle of the quarter-wave plate of the polarization controller 1210 (S1403). The controller 170 then obtains the power P1 of the X-polarized light and the power P2 of the Y-polarized light according to the prescribed information from the receiver 160 (S1404).

The controller 170 then determines whether the difference between the power P1 and power P2 obtained in S1404 is smaller than the difference between the power P1 and power P2 obtained in S1401 (S1405). If the difference between the power P1 and the power P2 has been reduced in S1405 (the result in S1405 is Yes), the controller 170 proceeds to S1408. If the difference between the power P1 and the power P2 has not been reduced (the result in S1405 is No), the controller 170 decreases the angle of the quarter-wave plate of the polarization controller 1210 (S1406).

The controller 170 then obtains the power P1 of the X-polarized light and the power P2 of the Y-polarized light according to the prescribed information from the receiver 160 (S1407). The controller 170 then increases the angle of the half-wave plate of the polarization controller 1210 (S1408). The controller 170 then obtains the power P1 of the X-polarized light and the power P2 of the Y-polarized light according to the prescribed information from the receiver 160 (S1409).

The controller 170 then determines whether the difference between the power P1 and the power P2 that have been obtained in S1409 is smaller than the difference between the power P1 and the power P2 that were previously obtained (S1410). The power P1 and power P2 that were previously obtained are the power P1 and power P2 that were obtained in S1404 or S1407, whichever was executed last.

If the difference between the power P1 and the power P2 has been reduced in S1410 (the result in S1410 is Yes), the controller 170 returns to S1401. If the difference between the power P1 and the power P2 has not been reduced (the result in S1410 is No), the controller 170 decreases the angle of the half-wave plate of the polarization controller 1210 (S1411) and returns to S1401. In the above operations, the controller 170 can control the difference in power between the polarized lights of polarization-multiplexed light so that the difference in power (P1−P2) between the polarized lights, measured in the measuring apparatus 400, is equal to or smaller than the threshold.

The above operations may be executed by the processor 450 in the measuring apparatus 400. In this case, the processor 450 obtains the power P1 and power P2 from the power monitors 441 and 442 (in the case of the example in FIG. 4A) according to the monitoring result, in S1401, S1404, S1407, and S1409.

In S1403, the processor 450 sends, to the transmitting apparatus 100 as the prescribed information (data), a control command instructing it to control the polarization controller 1210 so as to increase the angle of the quarter-wave plate. In S1406, the processor 450 sends, to the transmitting apparatus 100 as the prescribed information, a control command instructing it to control the polarization controller 1210 so as to decrease the angle of the quarter-wave plate. In S1408, the processor 450 sends, to the transmitting apparatus 100 as the prescribed information, a control command instructing it to control the polarization controller 1210 so as to increase the angle of the half-wave plate. In S1411, the processor 450 sends, to the transmitting apparatus 100 as the prescribed information, a control command instructing it to control the polarization controller 1210 so as to decrease the angle of the half-wave plate.

Although, in the above procedure, the quarter-wave plate and half-wave plate of the polarization controller 1210 have been alternately controlled, one of the quarter-wave plate and half-wave plate may be first adjusted in a variable range and the other may be then adjusted. Although the quarter-wave plate and half-wave plate have been controlled in that order, the half-wave plate may be first controlled and the quarter-wave plate may be then controlled.

The polarized lights may be randomly changed by the polarization controller 1210 until the difference in power (P1−P2) between the polarized lights, measured in the measuring apparatus 400, falls to or below the threshold. In this case, the polarization controller 1210 adjusts the polarized lights at, for example, the time of an initial setup. This can avoid an effect on signal quality that would otherwise be caused as a result of randomly changing the polarized lights.

Figure 15:
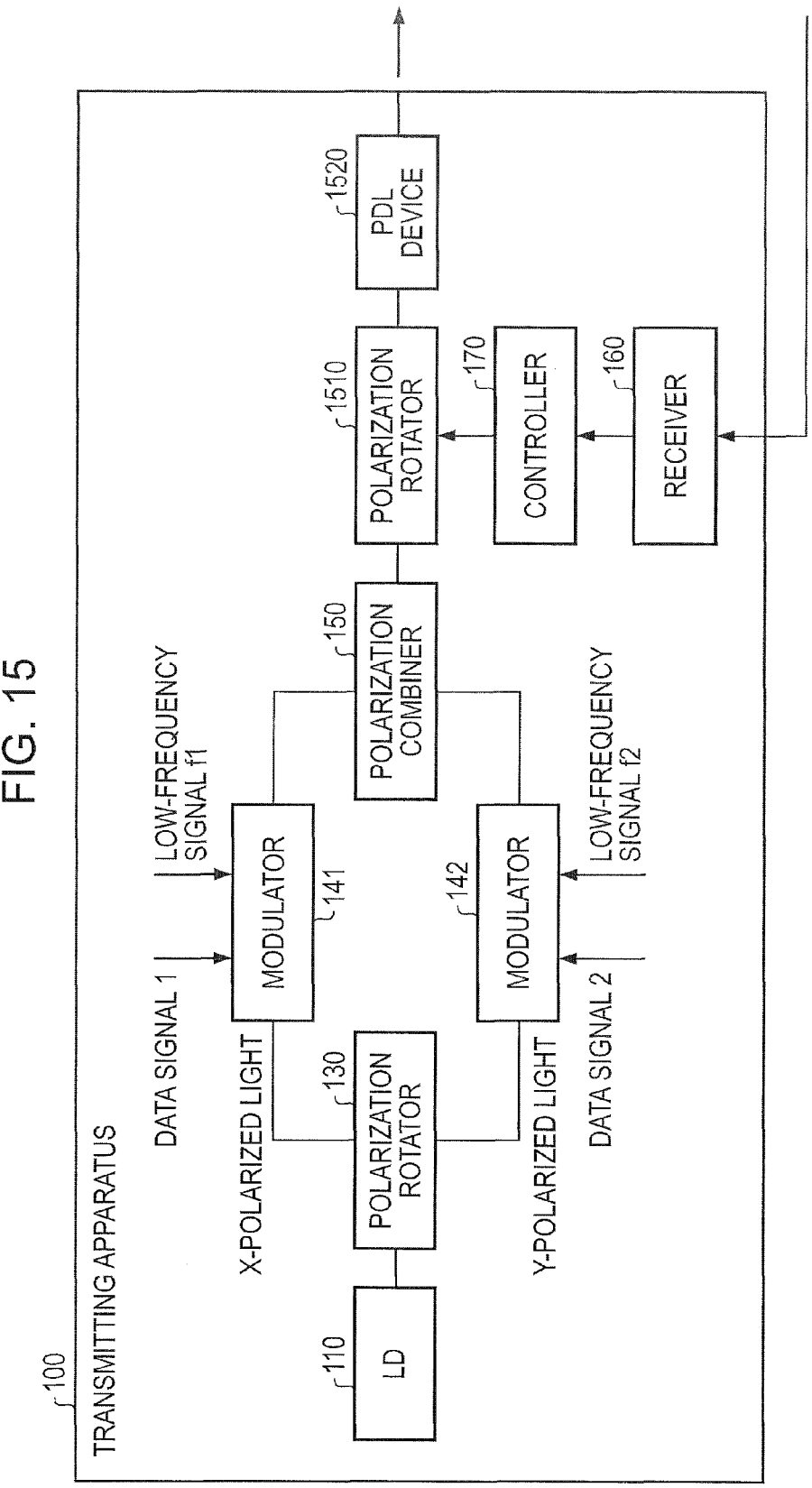
FIG. 15 illustrates a second variation of the transmitting apparatus depicted in FIG. 1.

FIG. 15 gives a second variation of the transmitting apparatus depicted in FIG. 1. In FIG. 15, the same elements as in FIG. 12 are denoted by the same reference numerals to eliminate duplicate descriptions. As depicted in FIG. 15, the transmitting apparatus 100 may have a polarization rotator 1510 and a PDL device 1520 instead of the polarization controller 1210 in FIG. 12. The polarization combiner 150 outputs combined light to the polarization rotator 1510.

The polarization rotator 1510 rotates a polarized light of light output from the polarization combiner 150 and outputs the light, the polarized light of which has been rotated, to the PDL device 1520. The light output from the polarization rotator 1510 is transmitted through the PDL device 1520 and is output to the stage behind the transmitting apparatus 100. The PDL device 1520 is a device having a polarization dependent loss.

When a polarized light of the light is rotated by the polarization combiner 150, therefore, the power loss ratio between the X-polarized light and the Y-polarized light can be changed in the PDL device. Accordingly, the difference in power between the polarized lights of the light sent from the transmitting apparatus 100 can be controlled. The controller 170 controls an amount by which the polarized light is rotated by the polarization rotator 1510, according to the prescribed information (data) from the receiver 160.

The transmitting apparatus depicted in FIG. 15 carries out control as indicated by the operations illustrated in FIG. 7. In S704 and S705 in FIG. 7, however, the controller 170 controls the polarization rotator 1510 to control the difference in power between the polarized lights.

Figure 16:
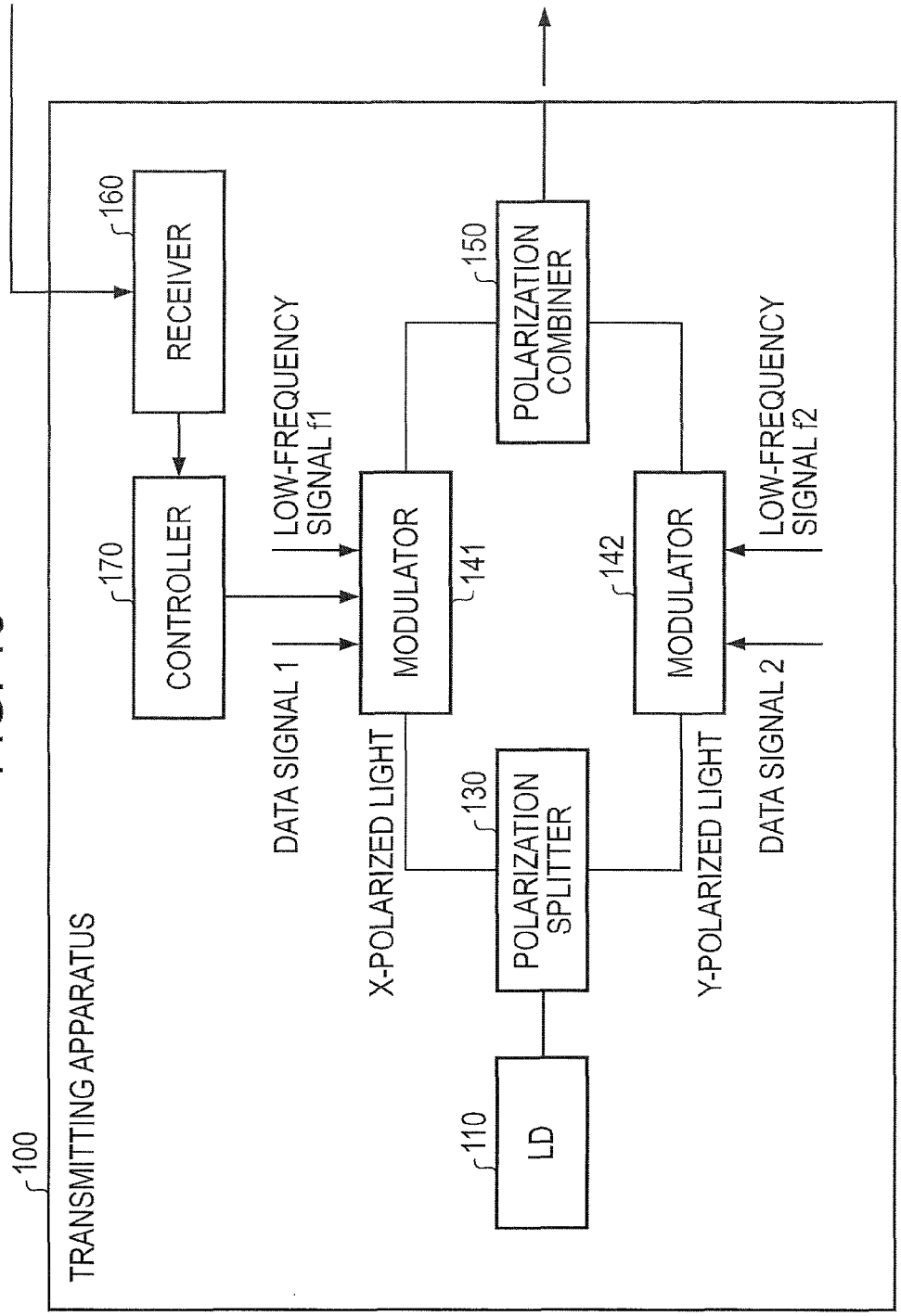
FIG. 16 illustrates a third variation of the transmitting apparatus depicted in FIG. 1.
Figure 17:
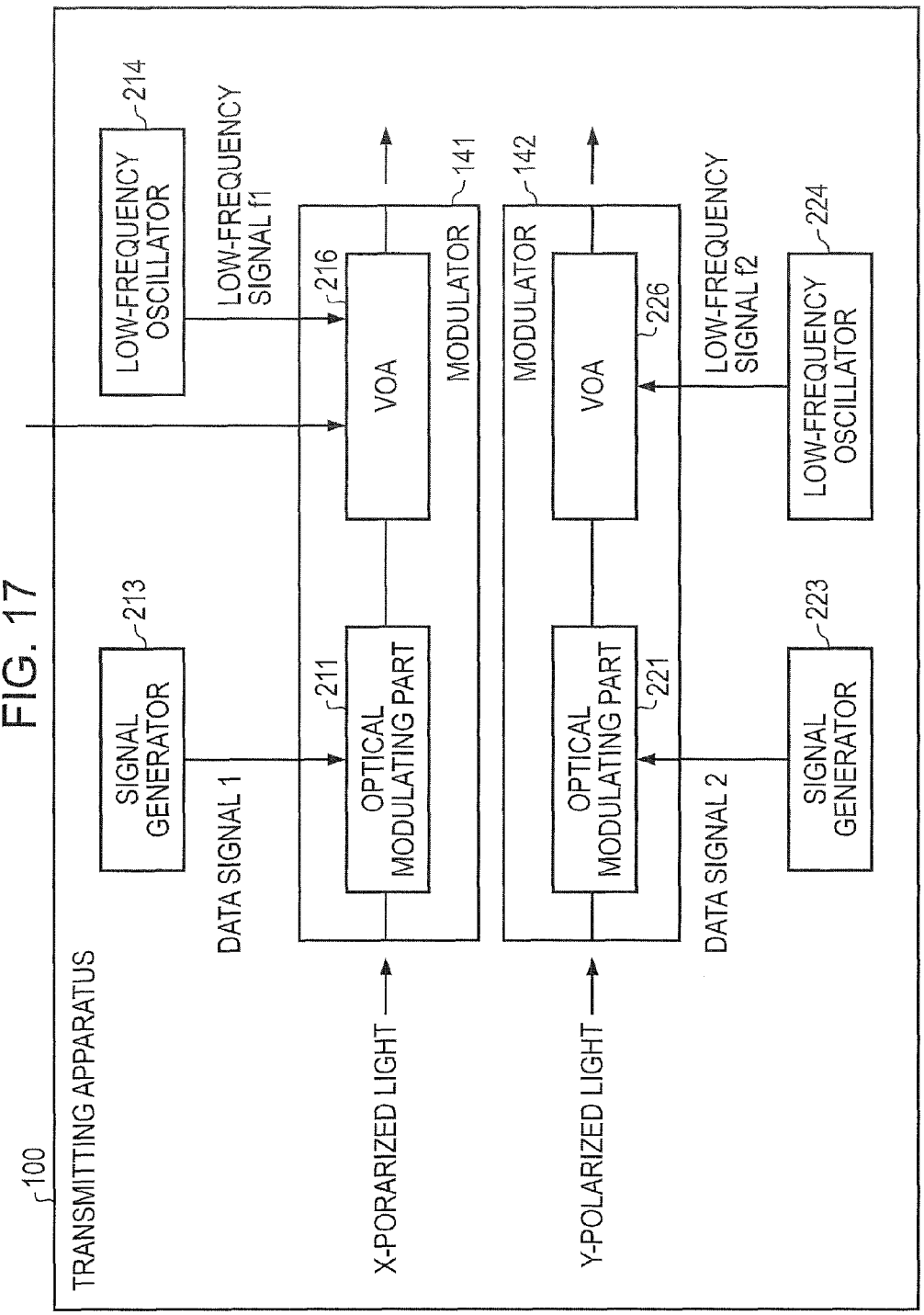
FIG. 17 illustrates an example of the modulator depicted in FIG. 16.

FIG. 16 gives a third variation of the transmitting apparatus depicted in FIG. 1. FIG. 17 gives an example of the modulator depicted in FIG. 16. In FIG. 16, the same elements as in FIG. 12 are denoted by the same reference numerals to eliminate duplicate descriptions. In FIG. 17, the same elements as in FIG. 2C are denoted by the same reference numerals to eliminate duplicate descriptions.

As depicted in FIG. 16, the controller 170 in the transmitting apparatus 100 may control the modulator 141 to control a difference in power between polarized lights. In this case, the modulator 141 is structured so that modulation based on the low-frequency signal f1 is carried out in the VOA 216, as depicted in FIG. 17. The VOA 216 attenuates the power (average power, for example) of light under control of the controller 170.

Then, the difference in power between the X-polarized light and the Y-polarized light can be controlled by superimposing the low-frequency signal f1 on the X-polarized light and changing the power of the X-polarized light. The VOA 216 may double as a controller that controls the difference in power between the polarized lights. Although a case in which the controller 170 controls the VOA 216 has been described, the controller 170 may controls the VOA 226. Alternatively, the controller 170 may control the VOA 216 and VOA 226.

In the structure in which the controller 170 controls the VOA 216 and VOA 226, the controller 170 may perform control so that the total of the power output from the VOA 216 and VOA 226 is constant. When increasing the amount of attenuation by the VOA 216 by a change amount Δ, the controller 170 decreases the amount of attenuation by the VOA 226 by the change amount Δ. Accordingly, the power of the light (polarization-multiplexed optical signal) sent from the transmitting apparatus 100 can be made constant and adverse effects on the following stage can be suppressed. Another VOA different from the VOA 216 and VOA 226 may be provided so that the total of the power output from the VOA 216 and VOA 226 is kept constant.

Figure 18:
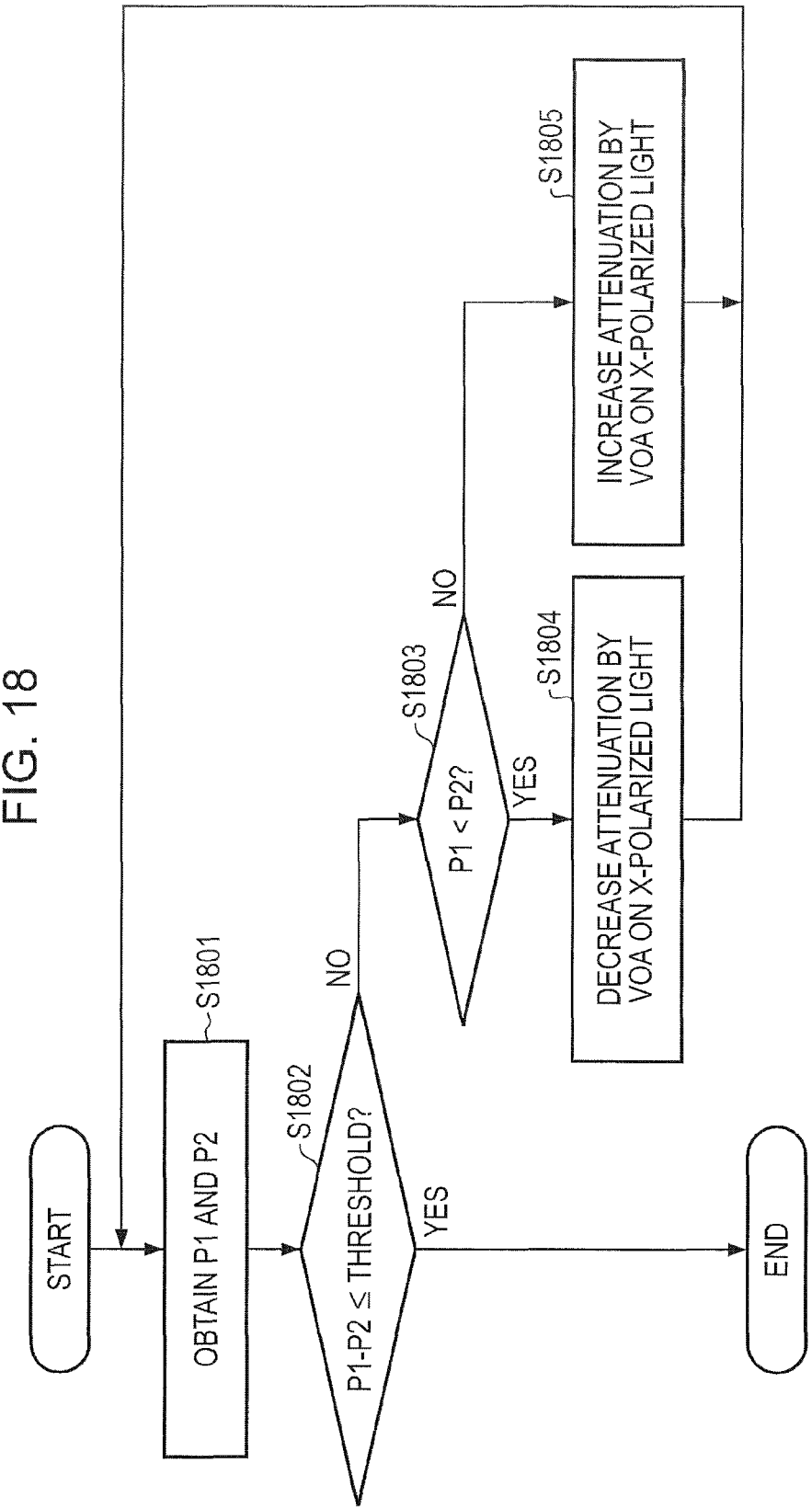
FIG. 18 is a flowchart illustrating an example of control performed by the transmitting apparatus depicted in FIG. 16.

FIG. 18 is a flowchart illustrating an example of control performed by the transmitting apparatus depicted in FIG. 16.

The controller 170 included in transmitting apparatus 100 in FIG. 16 repeatedly executes, for example, the operations in FIG. 18. S1801 to S1803 in FIG. 18 are the same as S701 to S703 in FIG. 7, so their explanation will be omitted.

If the power P1 is smaller than the power P2 in S1803 (the result in S1803 is Yes), the controller 170 decreases the amount of attenuation by the VOA 216 on the X-polarized light (S1804) and returns to S1801. Then, the power of the X-polarized light included in the light sent from the transmitting apparatus 100 can be increased.

If the power P1 is not smaller than the power P2 in S1803 (the result in S1803 is No), the controller 170 increases the amount of attenuation by the VOA 216 on the X-polarized light (S1805) and returns to S1801. Then, the power of the X-polarized light included in the light sent from the transmitting apparatus 100 can be decreased. In the above operations, the controller 170 can control the difference in power between the polarized lights of polarization-multiplexed optical signal so that the difference in power (P1−P2) between the polarized lights, measured in the measuring apparatus 400, is equal to or smaller than the threshold.

The above operations may be executed by the processor 450 in the measuring apparatus 400. In this case, the processor 450 obtains the power P1 and power P2 from the power monitors 441 and 442 (in the case of the example in FIG. 4A) according to the monitoring result, in S1801.

In S1804, the processor 450 sends, to the transmitting apparatus 100 as the prescribed information (data), a control command instructing it to control the VOA 216 so as to decrease the amount of attenuation. In S1805, the processor 450 sends, to the transmitting apparatus 100 as the prescribed information, a control command instructing it to control the VOA 216 so as to increase the amount of attenuation.

Figure 19:
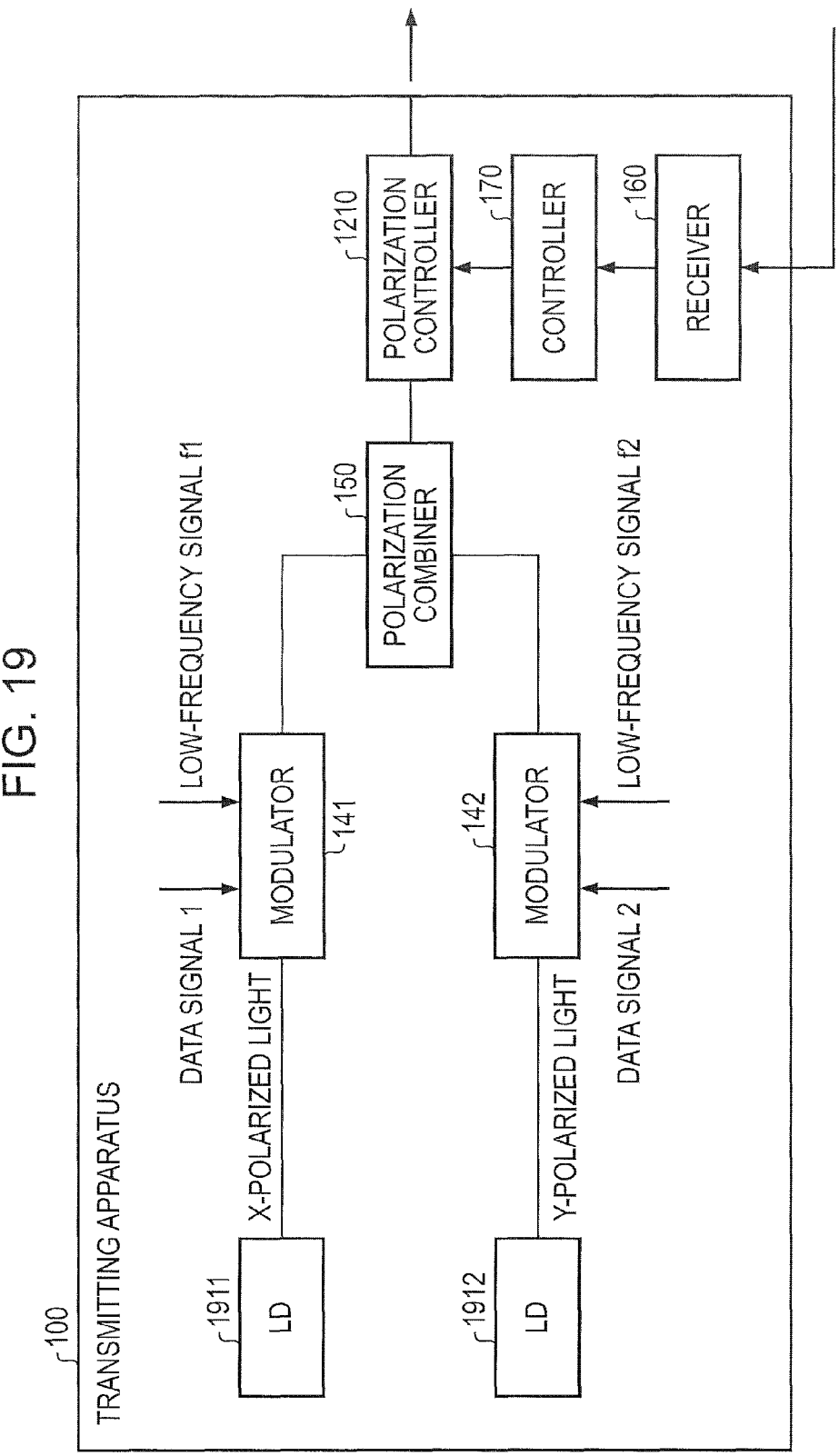
FIG. 19 illustrates a fourth variation of the transmitting apparatus depicted in FIG. 1.

FIG. 19 gives a fourth variation of the transmitting apparatus depicted in FIG. 1. In FIG. 19, the same elements as in FIG. 12 are denoted by the same reference numerals to eliminate duplicate descriptions. As depicted in FIG. 19, the transmitting apparatus 100 may have an LD 1911 and an LD 1912 instead of the LD 110 and polarization splitter 130 in FIG. 12.

The LD 1911 generates X-polarized light and output the generated light to the modulator 141, and the LD 1912 generates Y-polarized light and output the generated light to the modulator 142. The modulator 141 modulates the light output from the LD 1911, and the modulator 142 modulates the light output from the LD 1912.

In the transmitting apparatus 100 depicted in FIG. 19, the controller 170 may control the modulator 141 to control a difference in power between polarized lights, as in FIG. 16 and FIG. 17. In this case, the polarization controller 1210 in FIG. 19 may be eliminated.

Figure 20:
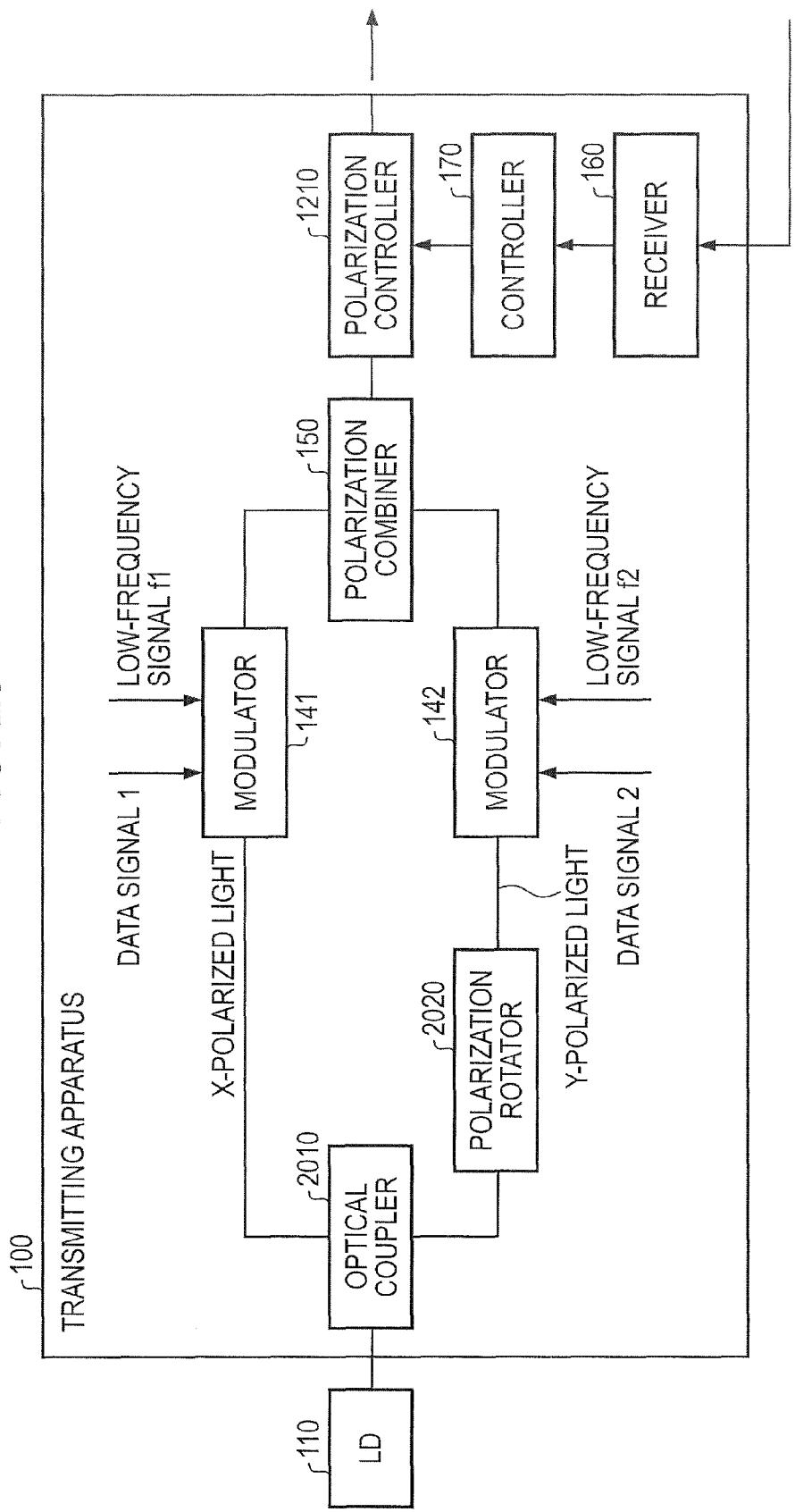
FIG. 20 illustrates a fifth variation of the transmitting apparatus depicted in FIG. 1.

FIG. 20 gives a fifth variation of the transmitting apparatus depicted in FIG. 1. In FIG. 20, the same elements as in FIG. 12 are denoted by the same reference numerals to eliminate duplicate descriptions. As depicted in FIG. 20, the transmitting apparatus 100 may have an optical coupler 2010 and a polarization rotator 2020 instead of the polarization splitter 130 in FIG. 12. The LD 110 generates X-polarized light and outputs the generated light to the optical coupler 2010.

The optical coupler 2010 splits the light output from the LD 110 (splits the power of the light), and outputs the split light to the modulator 141 and polarization rotator 2020. The modulator 141 modulates the light output from the optical coupler 2010. The polarization rotator 2020 rotates the X-polarized light output from the optical coupler 2010 by 90 degrees to produce a Y-polarized light and outputs the light having the rotated polarized light to the modulator 142. The modulator 142 modulates the light output from the polarization rotator 2020.

In the transmitting apparatus 100 depicted in FIG. 20, the controller 170 may control the modulator 141 to control a difference in power between polarized lights, as in FIG. 16 and FIG. 17. In this case, the polarization controller 1210 in FIG. 20 may be eliminated.

Figure 21:
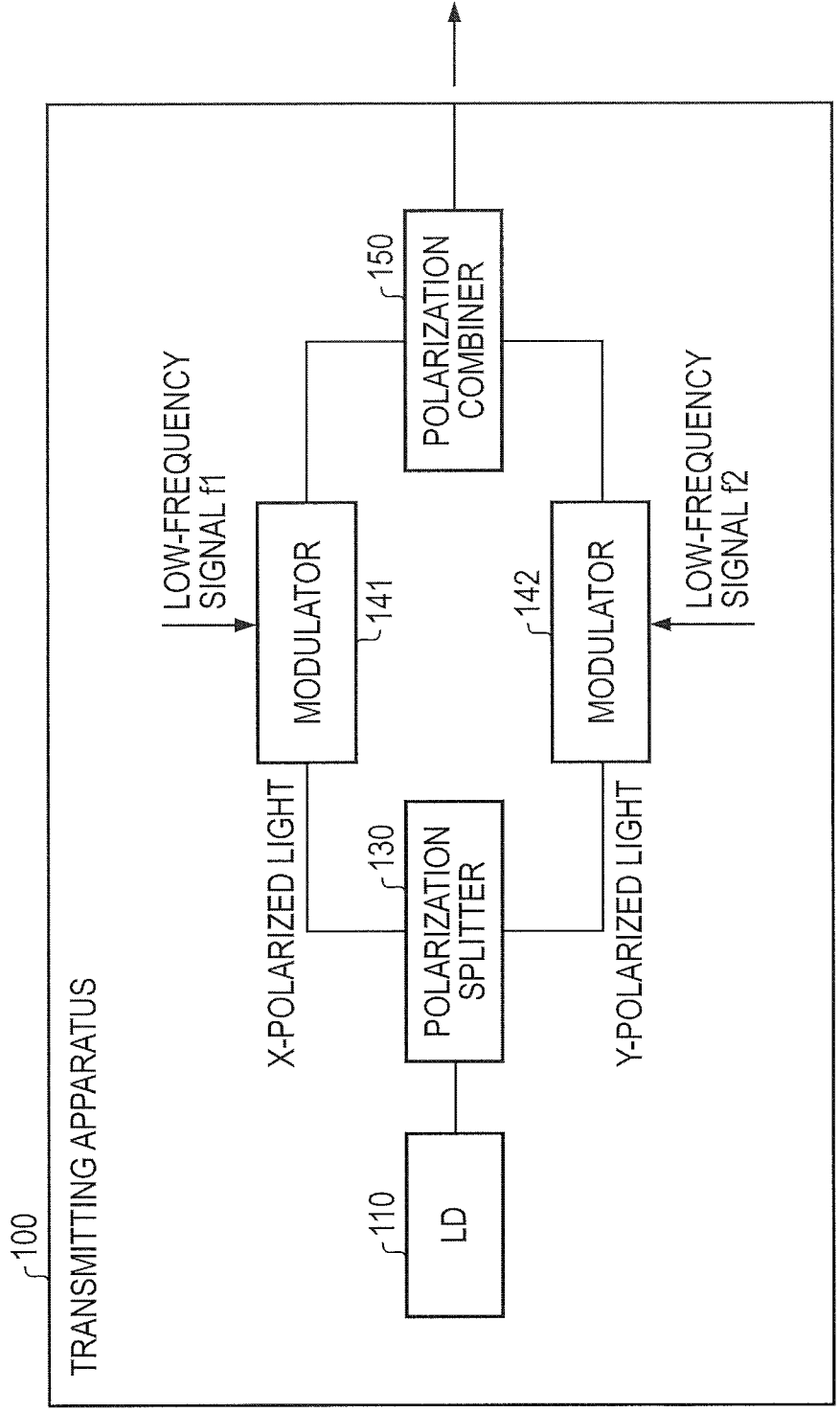
FIG. 21 illustrates a sixth variation of the transmitting apparatus depicted in FIG. 1.
Figure 22:
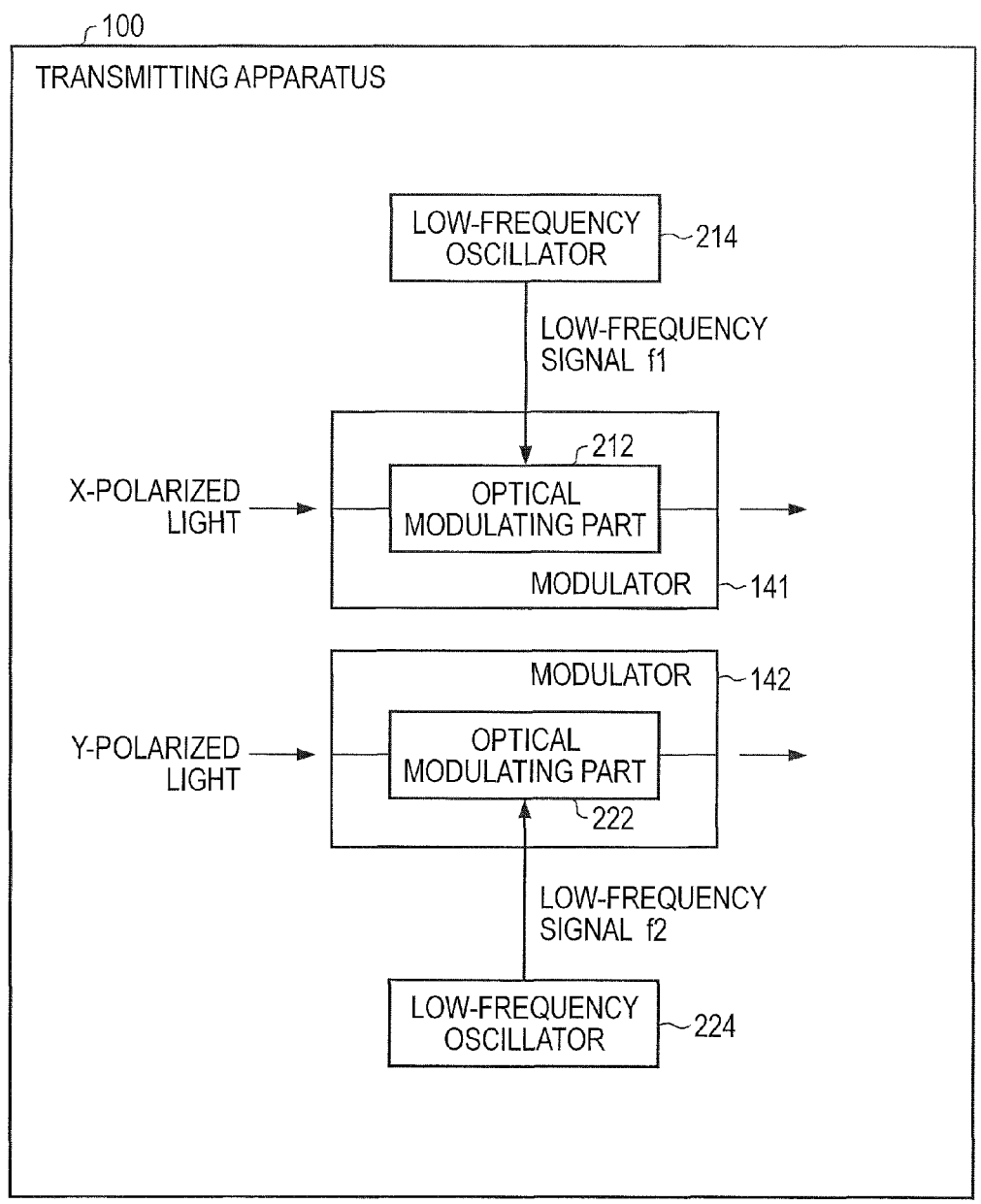
FIG. 22 illustrates an example of the modulator depicted in FIG. 21.

FIG. 21 gives a sixth variation of the transmitting apparatus depicted in FIG. 1. In FIG. 21, the same elements as in FIG. 1 are denoted by the same reference numerals to eliminate duplicate descriptions. FIG. 22 gives an example of the modulator depicted in FIG. 21. In FIG. 22, the same elements as in FIG. 2A are denoted by the same reference numerals to eliminate duplicate descriptions.

As depicted in FIG. 21 and FIG. 22, the modulator 141 in the transmitting apparatus 100 performs modulation of light based on the low-frequency signal f1 and does not need to perform modulation based on the data signal 1. The modulator 142 performs modulation of light based on the low-frequency signal f2 and does not need to perform modulation based on the data signal 2. In this case, the transmitting apparatus 100 may have a structure in which the signal generators 213 and 223 and optical modulating parts 211 and 221 in FIG. 2A are eliminated.

As described above, the transmitting apparatus 100 may be used as a transmitting apparatus for measuring the PDL. In this case, the transmitting apparatus 100 does not need to control the difference in power between polarized lights. Therefore, the transmitting apparatus 100 may have a structure in which the receiver 160 and controller 170 in FIG. 1 are eliminated.

Furthermore, the measuring apparatus 400 in FIGS. 4A to 4D, for example, may have a structure in which the transmitter 460 is eliminated. In this case, the processor 450 (output unit) notifies an administrator of information indicating, for example, an obtained difference in power between the low-frequency signal f1 and the low-frequency signal f2. The administrator can know, from the notification output from the measuring apparatus 400, a difference in power between polarized lights that was generated owing to a PDL in the range from the transmitting apparatus 100 to the measuring apparatus 400, and can design and adjust a communication system.

As described above, according to the disclosed communication system, measuring apparatus, transmitting apparatus, and measurement method, signals (low-frequency signal f1 and low-frequency signal f2, for example), each of which has a different frequency, are superimposed on polarized lights included in polarization-multiplexed optical signal, and a measuring apparatus can measure the power of each signal. A simple structure can then be used to measure a PDL-caused difference in power between the polarized lights. Accordingly, transmission quality can be improved by controlling the difference in power between the polarized lights included in polarization-multiplexed optical signal, improving transmission quality. Alternatively, transmission quality can be improved by controlling the polarization state of polarization-multiplexed optical signal.

Although a single transmission line from the transmitting apparatus 501 to the receiving apparatus 502 (refer to FIG. 5, for example) has been used in the above description, it is also possible to measure PDL-caused differences in power between polarized lights on a plurality of transmission lines in the communication system 500. In this case, on each of the plurality of transmission lines, the transmitting apparatus 100 is connected to the transmission node, and the measuring apparatus 400 is connected to the relay node or reception node. The low-frequency signals f1 in the plurality of transmission apparatuses 100 are set so that they have different frequencies, and the low-frequency signals f2 in the plurality of transmission apparatuses 100 are set so that they have different frequencies.

The measuring apparatus 400 can measure PDLs of all wavelengths of the polarization-multiplexed optical signal without the measuring apparatus 400 being provided for each wavelength. The measuring apparatus 400 can also measure a PDL-caused difference in power between polarized lights in real time during in-service. Accordingly, even if the PDL-caused difference in power between polarized lights is changed during in-service, the power difference between the polarized lights can be controlled and can be measured with a simple structure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A communication system comprising:
    a transmission apparatus comprising
        a first modulator to modulate a first light that is polarized in a first direction by using a first signal to be transferred and a second signal having a frequency different from a frequency of the first signal so as to generate a first optical signal,
        a second modulator to modulate a second light that is polarized in a second direction different from the first direction by using a third signal to be transferred and a fourth signal having a frequency different from a frequency of the third signal so as to generate a second optical signal,
        a polarization combiner to polarization-multiplex the first optical signal and the second optical signal into a polarization-multiplexed optical signal in which the first optical signal and the second optical signal are polarization-multiplexed,
        the polarization-multiplexed optical signal being transmitted by the transmission apparatus; and
    a measuring apparatus configured to measure powers of the second signal and the fourth signal which are included in the polarization-multiplexed optical signal transmitted from the transmission apparatus, the measuring apparatus being disposed on a path through which the polarization-multiplexed optical signal is transferred,
    wherein the transmission apparatus controls, based on the measured powers, transmission power of the first light before being modulated using the second signal and transmission power of the second light before being modulated using the fourth signal.

2. The communication system according to claim 1, wherein the measuring apparatus notifies the transmission apparatus of data based on measured powers of the second signal and the fourth signal,
    wherein the transmission apparatus controls the transmission power of the first light and the transmission power of the second light based on said data notified from the measuring apparatus.

3. The communication system according to claim 2, wherein the transmission apparatus controls the transmission power of the first light and the transmission power of the second light, so that a difference in the measured powers becomes to be smaller.

4. The communication system according to claim 1, wherein the second signal has a frequency lower than the frequency of the first signal and the fourth signal has a frequency lower than the frequency of the third signal.

5. A transmission apparatus comprising:
    a superimposing unit configured to
        modulate a first light that is polarized in a first direction by using a first signal to be transferred and superimpose a second signal having a frequency different from a frequency of the first signal on the first light modulated by using the first signal so as to generate a first optical signal, and
        modulate a second light that is polarized in a second direction different from the first direction by using a third signal to be transferred and superimpose a fourth signal having a frequency different from a frequency of the third signal on the second light modulated by using the third signal so as to generate a second optical signal;
    a multiplexer configured to polarization-multiplex the first optical signal and the second optical signal and transmit a polarization-multiplexed optical signal in which the first optical signal and the second optical signal are polarization-multiplexed;
    a receiver configured to receive data based on measured powers of the second signal and the fourth signal which are included in the polarization-multiplexed optical signal, the measured powers having been measured by a measuring apparatus that is disposed on a network to which the transmission apparatus transmits the polarization-multiplexed optical signal; and
    a controller configured to control transmission power of the first light before having the second signal superimposed thereon and transmission power of the second light before having the fourth signal superimposed thereon, based on the data received by the receiver, so that a difference in the measured powers becomes to be smaller.

6. The transmission apparatus according to claim 5, wherein:
    the controller is configured to control the transmission power of the first light and the transmission power of the second light by controlling polarization states of the first light and the second light.

7. The transmission apparatus according to claim 5, wherein the second signal has a frequency lower than the frequency of the first signal and the fourth signal has a frequency lower than the frequency of the third signal.

8. The transmission apparatus according to claim 5, further comprising:
    a polarization rotator configured to rotate polarized light; and
    a polarization splitter configured to split the polarized light rotated by the polarization rotator into the first light and the second light,
    wherein the controller controls an amount by which the polarized light is rotated by the polarization rotator so as to control the transmission power of the first light and the transmission power of the second light.

9. The transmission apparatus according to claim 5, further comprising:
a polarization rotator configured to rotate the first light and the second light included in the polarization-multiplexed optical signal of the multiplexer; and
a polarization dependent loss (PDL) device having a polarization dependent loss, a polarization-multiplexed optical signal output from the polarization rotator being transmitted through the PDL device,
wherein the controller controls an amount by which the first light and the second light are rotated by the polarization rotator so as to control the transmission power of the first light and the transmission power of the second light.

10. The transmission apparatus according to claim 5, further comprising:
a variable optical attenuator configured to attenuate at least one power of the first optical signal and the second optical signal,
wherein the controller controls an amount of attenuation of the variable optical attenuator so as to control the transmission power of the first light and the transmission power of the second light.

11. A measuring method comprising:
transmitting a polarization-multiplexed optical signal in which a first optical signal and a second optical signal are polarization-multiplexed, by a transmission apparatus, the first optical signal being generated by modulating a first light that is polarized in a first direction by a first modulator using a first signal to be transferred and a second signal having a frequency different from a frequency of the first signal, the second optical signal being generated by modulating a second light that is polarized in a second direction different from the first direction by a second modulator using a third signal to be transferred and a fourth signal having a frequency different from a frequency of the third signal;
measuring powers of the second signal and the fourth signal which are included in the polarization-multiplexed optical signal transmitted from the transmission apparatus, by a measuring apparatus, the measuring apparatus being disposed on a path through which the polarization-multiplexed optical signal is transferred;
notifying the transmission apparatus of data based on the measured powers, by the measuring apparatus; and
controlling, by the transmission apparatus, power of the first light before being modulated using the second signal and power of the second light before being modulated using the fourth signal, based on the data based on the measured powers transmitted from the measuring apparatus.

12. The measuring method according to claim 11, wherein:
said controlling controls the power of the first light and the power of the second light by controlling polarization states of the first light and the second light.

13. The measuring method according to claim 11, wherein the second signal has a frequency lower than the frequency of the first signal and the fourth signal has a frequency lower than the frequency of the third signal.

14. A transmitter comprising:
a polarization rotator that receives a polarized light, and rotates polarization of the received polarized light, to thereby provide polarization rotated light;
a polarization splitter that splits the polarization rotated light into a first polarized light polarized in a first direction, and a second polarized light polarized in a second direction different from the first direction;
a first modulator that receives the first polarized light, and modulates the first polarized light by using a first data signal and a first frequency signal having a frequency different from a frequency of the first data signal, to thereby generate a first optical signal;
a second modulator that receives the second polarized light, and modulates the second polarized light by using a second data signal and a second frequency signal having a frequency different from a frequency of the second data signal, to thereby generate a second optical signal;
a polarization combiner that polarization-multiplexes the first optical signal and the second optical signal, to thereby provide a polarization-multiplexed optical signal that is transmitted by the transmitter; and
a controller that, in accordance with data provided to the controller, controls an amount by which the polarized light received by the polarization rotator is rotated by the polarization rotator to thereby control transmission power of the first polarized light and transmission power of the second polarized light,
wherein the data provided to the controller is based on power of the first frequency signal and the second frequency signal as measured from the polarization-multiplexed optical signal downstream of the transmitter after being transmitted by the transmitter.

15. A transmitter according to claim 14, wherein the controller controls the amount by which the polarized light received by the polarization rotator is rotated by the polarization rotator so that a difference between the power of the first frequency signal and the second frequency signal as measured from the polarization-multiplexed optical signal downstream of the transmitter after being transmitted by the transmitter is reduced.

16. A transmitter according to claim 14, wherein the controller controls the amount by which the polarized light received by the polarization rotator is rotated by the polarization rotator so that a difference between the power of the first frequency signal and the second frequency signal as measured from the polarization-multiplexed optical signal downstream of the transmitter after being transmitted by the transmitter does not exceed a threshold.

17. A transmitter according to claim 14, wherein the controller controls the amount by which the polarized light received by the polarization rotator is rotated by the polarization rotator so that a difference between the power of the first frequency signal and the second frequency signal as measured from the polarization-multiplexed optical signal downstream of the transmitter after being transmitted by the transmitter falls within a prescribed range.

* * * * *